US012696274B2

(12) United States Patent
Xiao et al.

(10) Patent No.: US 12,696,274 B2
(45) Date of Patent: Jul. 28, 2026

(54) METHOD AND APPARATUS FOR DOWNLINK TRANSMISSION IN PHYSICAL DOWNLINK CONTROL CHANNEL

(71) Applicant: LENOVO (BEIJING) LIMITED, Beijing (CN)

(72) Inventors: Lingling Xiao, Beijing (CN); Bingchao Liu, Beijing (CN); Chenxi Zhu, Beijing (CN); Wei Ling, Beijing (CN); Yi Zhang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 550 days.

(21) Appl. No.: 18/018,697

(22) PCT Filed: Jul. 31, 2020

(86) PCT No.: PCT/CN2020/106253
§ 371 (c)(1),
(2) Date: Jan. 30, 2023

(87) PCT Pub. No.: WO2022/021345
PCT Pub. Date: Feb. 3, 2022

(65) Prior Publication Data
US 2024/0015740 A1     Jan. 11, 2024

(51) Int. Cl.
*H04W 72/1273*        (2023.01)
*H04B 7/06*           (2006.01)
(Continued)

(52) U.S. Cl.
CPC ...... *H04W 72/1273* (2013.01); *H04B 7/0626* (2013.01); *H04W 72/0457* (2023.01); *H04W 72/232* (2023.01)

(58) Field of Classification Search
None
See application file for complete search history.

(56) References Cited

U.S. PATENT DOCUMENTS 10,925,044 B1 *  2/2021  Zhou ..................... H04L 5/0044
10,952,231 B2 *  3/2021  Liou ..................... H04W 76/27
(Continued)

FOREIGN PATENT DOCUMENTS

CN        108199819 A      6/2018
EP          3565172 A1    11/2019
(Continued)

OTHER PUBLICATIONS

International Searching Authority, "Written Opinion of the International Searching Authority," PCT/CN2020/106253, Apr. 21, 2021, pp. 1-3.
(Continued)

*Primary Examiner* — Otis L Thompson, Jr.
(74) *Attorney, Agent, or Firm* — Kunzler Needham & Hilton; Bruce R. Needham

(57) ABSTRACT

The present application relates to a method and an apparatus for downlink transmission in physical downlink control channel. The method includes: determining at least one transmission configuration indicator (TCI) state for receiving a physical down-link shared channel (PDSCH) or an aperiodic channel state information reference signal (AP CSI-RS), wherein multiple TCI states are activated for at least one control resource set (CORESET) in active bandwidth part (BWP) in serving cell; and receiving the PDSCH or the AP CSI-RS according to the determined at least one TCI state.

20 Claims, 14 Drawing Sheets

300

Determining at least one TCI state for receiving a PDSCH or an AP CSI-RS, wherein multiple TCI states are activated for at least one CORESET in active BWP in serving cell     S301

Receiving a PDSCH or an AP CSI-RS according to the determined at least one TCI state
S302

(51) Int. Cl.
  *H04W 72/0457* (2023.01)
  *H04W 72/232* (2023.01)

(56) References Cited

U.S. PATENT DOCUMENTS

| | | | | |
|---|---|---|---|---|
| 11,129,161 B2* | 9/2021 | Guo | | H04L 5/0053 |
| 11,902,985 B2* | 2/2024 | Mondal | | H04W 72/56 |
| 11,979,355 B2* | 5/2024 | Su | | H04L 5/0035 |
| 12,323,975 B2* | 6/2025 | Kim | | H04L 5/00 |
| 2019/0230545 A1* | 7/2019 | Liou | | H04W 24/10 |
| 2019/0297637 A1* | 9/2019 | Liou | | H04W 72/1273 |
| 2019/0373450 A1* | 12/2019 | Zhou | | H04L 5/0023 |
| 2020/0100311 A1* | 3/2020 | Cirik | | H04B 7/0695 |
| 2020/0267712 A1* | 8/2020 | Cirik | | H04L 5/0023 |
| 2020/0288479 A1* | 9/2020 | Xi | | H04L 5/0092 |
| 2020/0314858 A1* | 10/2020 | Xu | | H04W 72/21 |
| 2020/0351892 A1* | 11/2020 | Yi | | H04L 5/0092 |
| 2021/0051635 A1* | 2/2021 | Lo | | H04B 7/024 |
| 2021/0084624 A1* | 3/2021 | Zhou | | H04W 72/0446 |
| 2021/0099981 A1* | 4/2021 | Cirik | | H04W 72/23 |
| 2021/0105749 A1* | 4/2021 | Zhou | | H04W 72/23 |
| 2021/0127388 A1* | 4/2021 | Venugopal | | H04L 5/0053 |
| 2021/0135830 A1* | 5/2021 | Yu | | H04B 7/06966 |
| 2021/0136802 A1* | 5/2021 | Cirik | | H04L 5/0092 |
| 2021/0153186 A1* | 5/2021 | Zhou | | H04L 5/0035 |
| 2021/0153217 A1* | 5/2021 | Zhou | | H04W 72/046 |
| 2021/0194658 A1* | 6/2021 | Venugopal | | H04W 76/27 |
| 2021/0195626 A1* | 6/2021 | Venugopal | | H04W 72/51 |
| 2021/0219336 A1* | 7/2021 | Fan | | H04L 5/0053 |
| 2021/0227526 A1* | 7/2021 | Khoshnevisan | | H04B 7/0695 |
| 2021/0258964 A1* | 8/2021 | Khoshnevisan | | H04B 7/022 |
| 2021/0298051 A1* | 9/2021 | Khoshnevisan | | H04W 72/0446 |
| 2021/0320711 A1* | 10/2021 | Lee | | H04W 76/19 |
| 2021/0410145 A1* | 12/2021 | Khoshnevisan | | H04W 72/1263 |
| 2022/0007410 A1* | 1/2022 | Cirik | | H04L 5/0094 |
| 2022/0030620 A1* | 1/2022 | Cirik | | H04W 52/0216 |
| 2022/0104237 A1* | 3/2022 | Muruganathan | | H04L 5/0051 |
| 2022/0174708 A1* | 6/2022 | Kim | | H04W 72/1273 |
| 2022/0304028 A1* | 9/2022 | Bagheri | | H04W 72/23 |
| 2022/0394708 A1* | 12/2022 | Gao | | H04L 5/0044 |
| 2023/0042806 A1* | 2/2023 | Frenne | | H04B 7/08 |
| 2023/0198721 A1* | 6/2023 | Gao | | H04L 5/0082 |
| | | | | 370/329 |

FOREIGN PATENT DOCUMENTS

| | | |
|---|---|---|
| WO | 2019221553 A1 | 11/2019 |
| WO | 2019236197 A1 | 12/2019 |
| WO | 2020030189 A1 | 2/2020 |

OTHER PUBLICATIONS

Nokia, Corrections on Cross-carrier Scheduling with Different Numerologies, 3GPP TSG-RAN WG1 Meeting #100, R1-2001443, Feb. 24-Mar. 6, pp. 1-10, e-meeting.

Apple Inc., "Remaining Issues for Multi-TRP Enhancement", 3GPP TSG RAN WG1 #100b R1-2002337, Apr. 20-30, 2020, pp. 1-17.

Oppo, "FL summary for Multi-TRP/Panel Transmission", 3GPP TSG RAN WG1 #100bis R1-2002406, Apr. 20-30, 2020, pp. 1-69.

* cited by examiner

Figure 3:
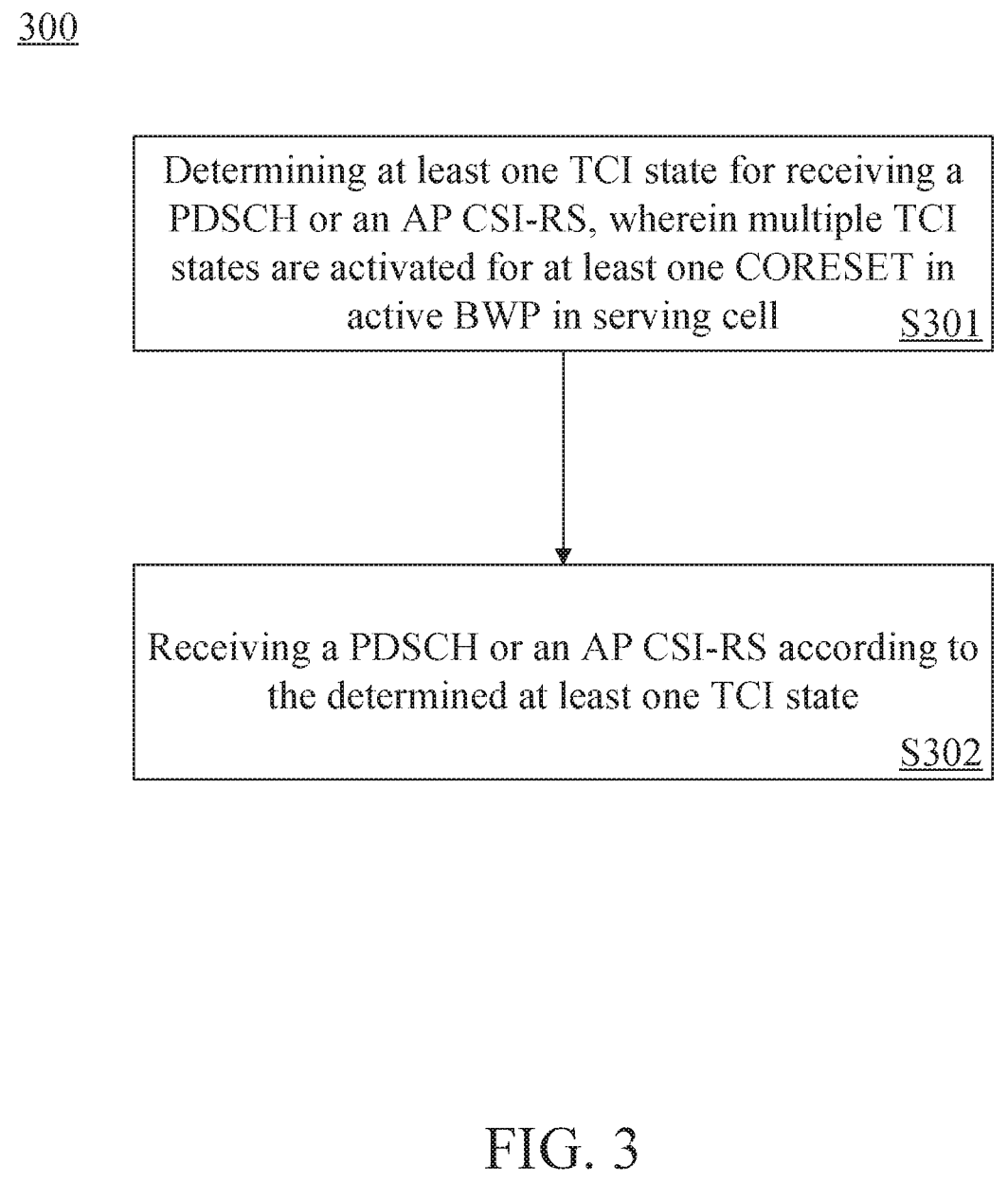

300

Determining at least one TCI state for receiving a
PDSCH or an AP CSI-RS, wherein multiple TCI
states are activated for at least one CORESET in
active BWP in serving cell        S301

Receiving a PDSCH or an AP CSI-RS according to
the determined at least one TCI state

Figure 4:
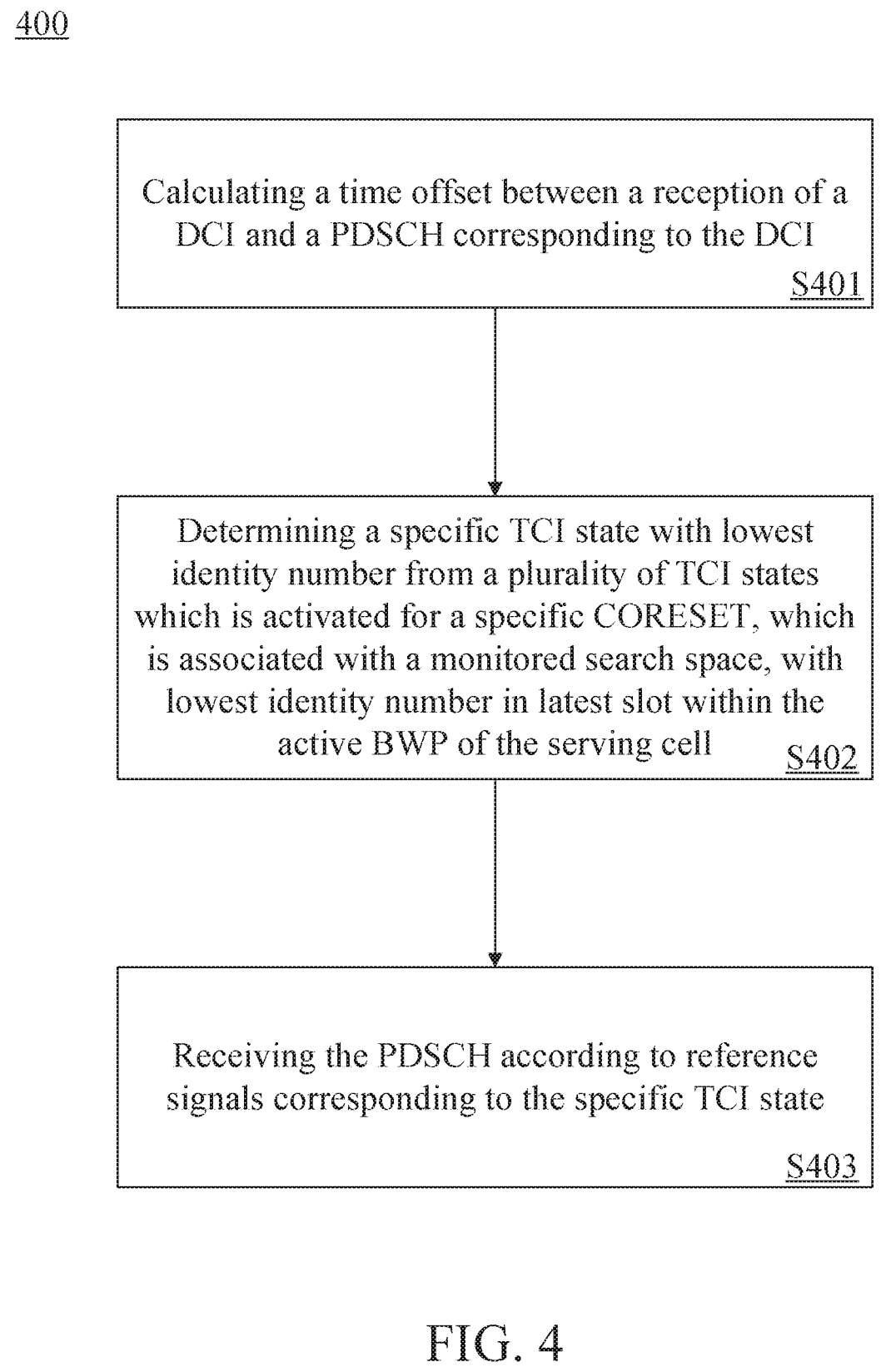

Calculating a time offset between a reception of a DCI and a PDSCH corresponding to the DCI

S401

Determining a specific TCI state with lowest identity number from a plurality of TCI states which is activated for a specific CORESET, which is associated with a monitored search space, with lowest identity number in latest slot within the active BWP of the serving cell

S402

Receiving the PDSCH according to reference signals corresponding to the specific TCI state

Figure 5:
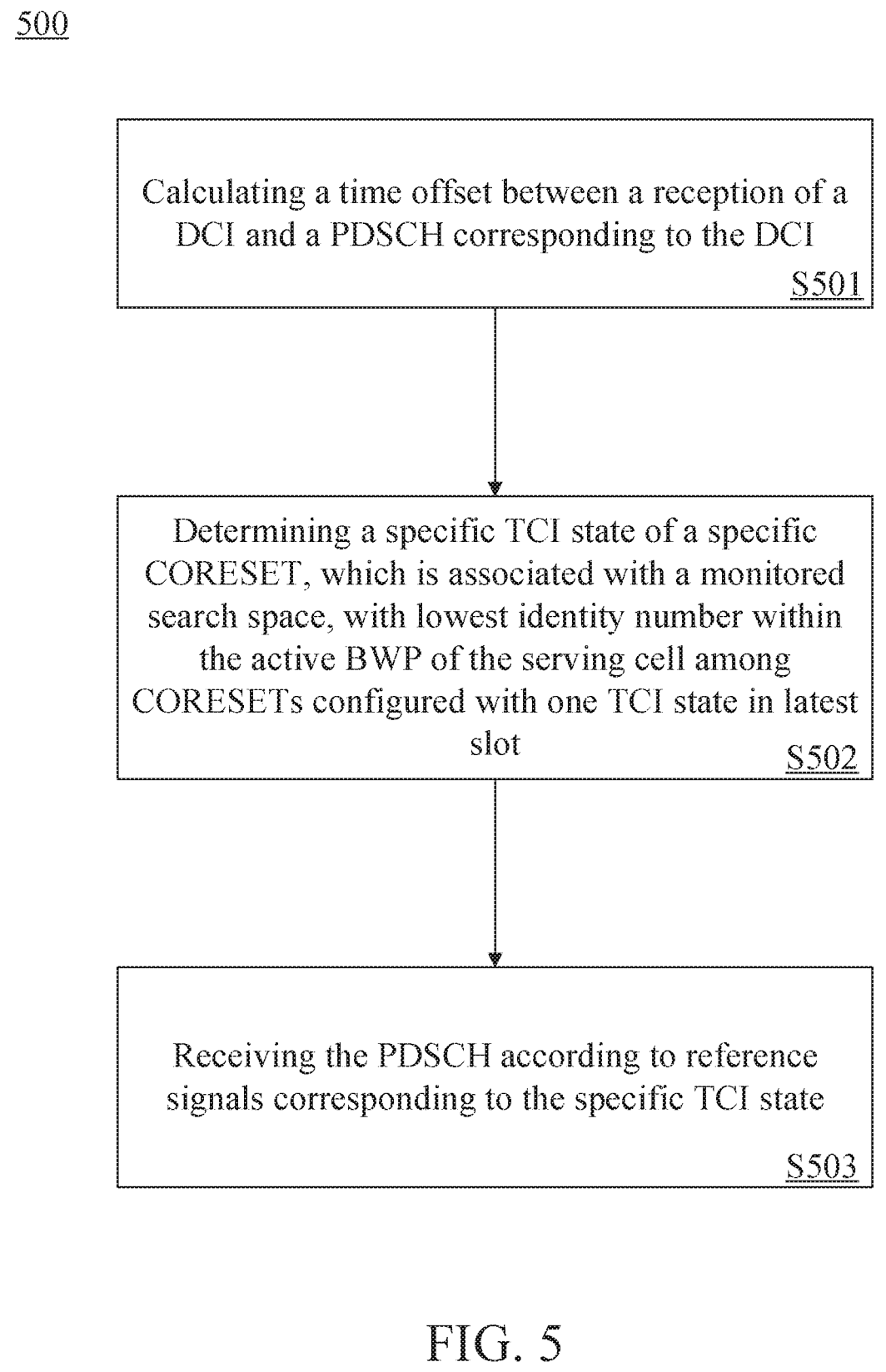

Calculating a time offset between a reception of a
DCI and a PDSCH corresponding to the DCI

S501

Determining a specific TCI state of a specific
CORESET, which is associated with a monitored
search space, with lowest identity number within
the active BWP of the serving cell among
CORESETs configured with one TCI state in latest
slot

S502

Receiving the PDSCH according to reference
signals corresponding to the specific TCI state

Figure 6:
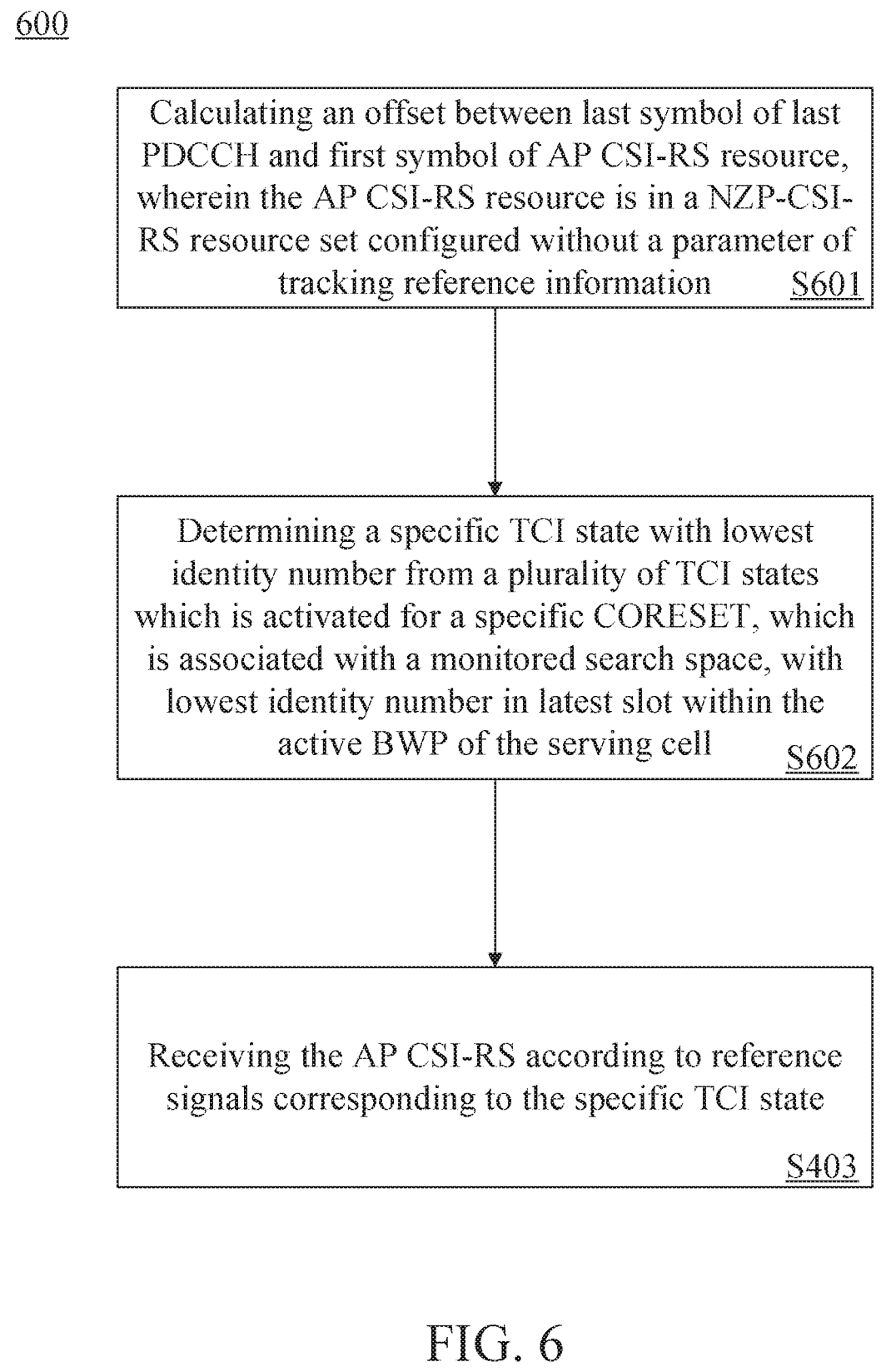

Calculating an offset between last symbol of last PDCCH and first symbol of AP CSI-RS resource, wherein the AP CSI-RS resource is in a NZP-CSI-RS resource set configured without a parameter of tracking reference information     S601

Determining a specific TCI state with lowest identity number from a plurality of TCI states which is activated for a specific CORESET, which is associated with a monitored search space, with lowest identity number in latest slot within the active BWP of the serving cell     S602

Receiving the AP CSI-RS according to reference signals corresponding to the specific TCI state

Figure 7:
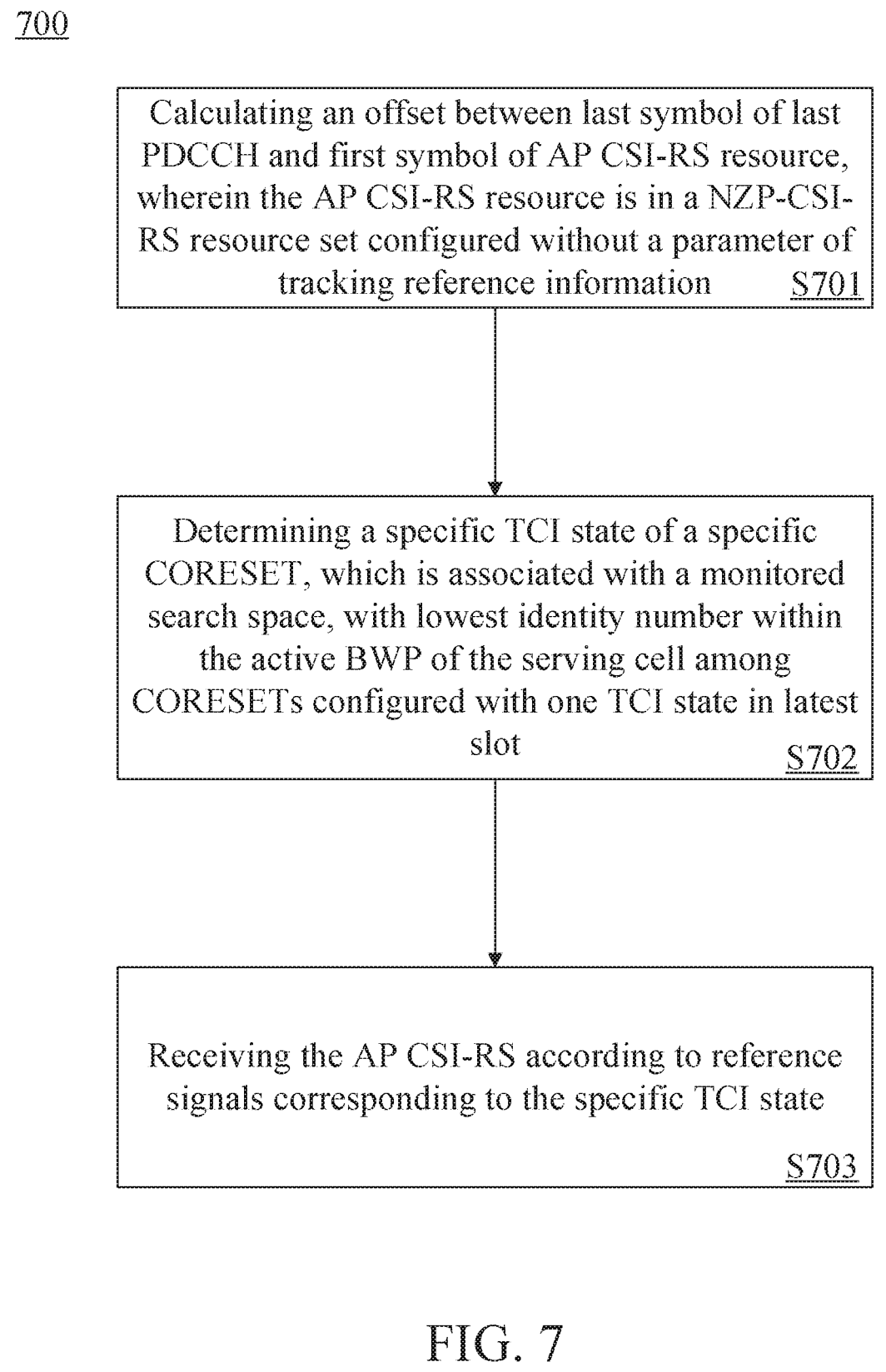

Calculating an offset between last symbol of last PDCCH and first symbol of AP CSI-RS resource, wherein the AP CSI-RS resource is in a NZP-CSI-RS resource set configured without a parameter of tracking reference information        S701

Determining a specific TCI state of a specific CORESET, which is associated with a monitored search space, with lowest identity number within the active BWP of the serving cell among CORESETs configured with one TCI state in latest slot        S702

Receiving the AP CSI-RS according to reference signals corresponding to the specific TCI state

Calculating a time offset between a reception of a DCI and a PDSCH corresponding to the DCI <u>S801</u>

Determining a specific TCI state with lowest identity number from a plurality of TCI states which is activated for a specific CORESET used for transmitting the DCI <u>S802</u>

Receiving the PDSCH according to reference signals corresponding to the specific TCI state <u>S803</u>

Calculating a time offset between a reception of a DCI and a PDSCH corresponding to the DCI

S901

Determining two specific TCI states corresponding to lowest TCI codepoint among TCI codepoints containing two TCI states

S902

Receiving the PDSCH according to reference signals corresponding to the two specific TCI states

S903

Figures 9B, 9C, 9D, 9E:
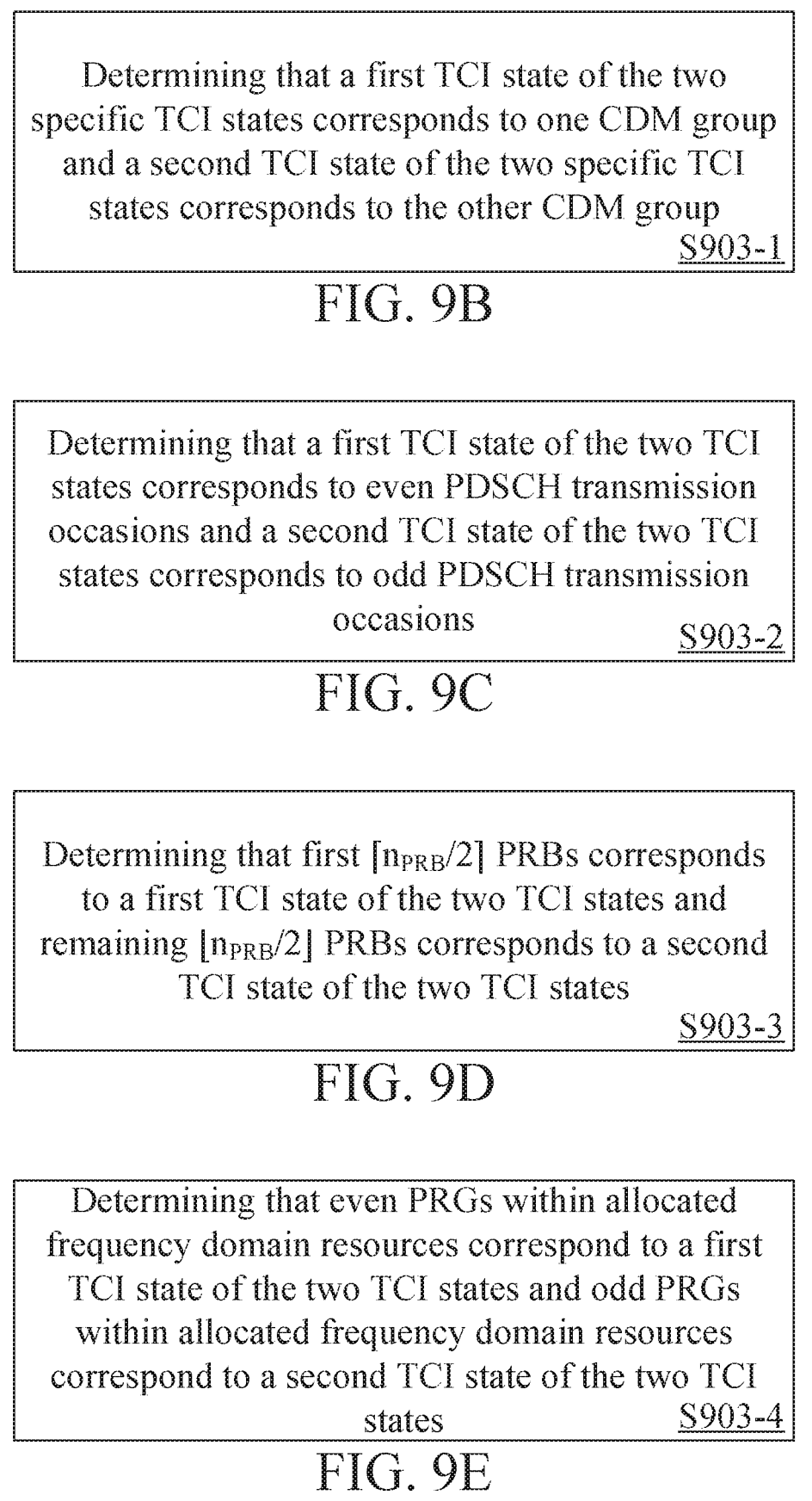

Determining that a first TCI state of the two specific TCI states corresponds to one CDM group and a second TCI state of the two specific TCI states corresponds to the other CDM group

Determining that a first TCI state of the two TCI states corresponds to even PDSCH transmission occasions and a second TCI state of the two TCI states corresponds to odd PDSCH transmission occasions

Determining that first $\lceil n_{PRB}/2 \rceil$ PRBs corresponds to a first TCI state of the two TCI states and remaining $\lfloor n_{PRB}/2 \rfloor$ PRBs corresponds to a second TCI state of the two TCI states

Determining that even PRGs within allocated frequency domain resources correspond to a first TCI state of the two TCI states and odd PRGs within allocated frequency domain resources correspond to a second TCI state of the two TCI states

Calculating a time offset between a reception of a DCI and a PDSCH corresponding to the DCI <u>S1001</u>

Determining two specific TCI states from a plurality of TCI states which is activated for a specific CORESET used for transmitting the DCI <u>S1002</u>

Receiving the PDSCH according to reference signals corresponding to the two specific TCI states <u>S1003</u>

Figures 10B, 10C, 10D, 10E:
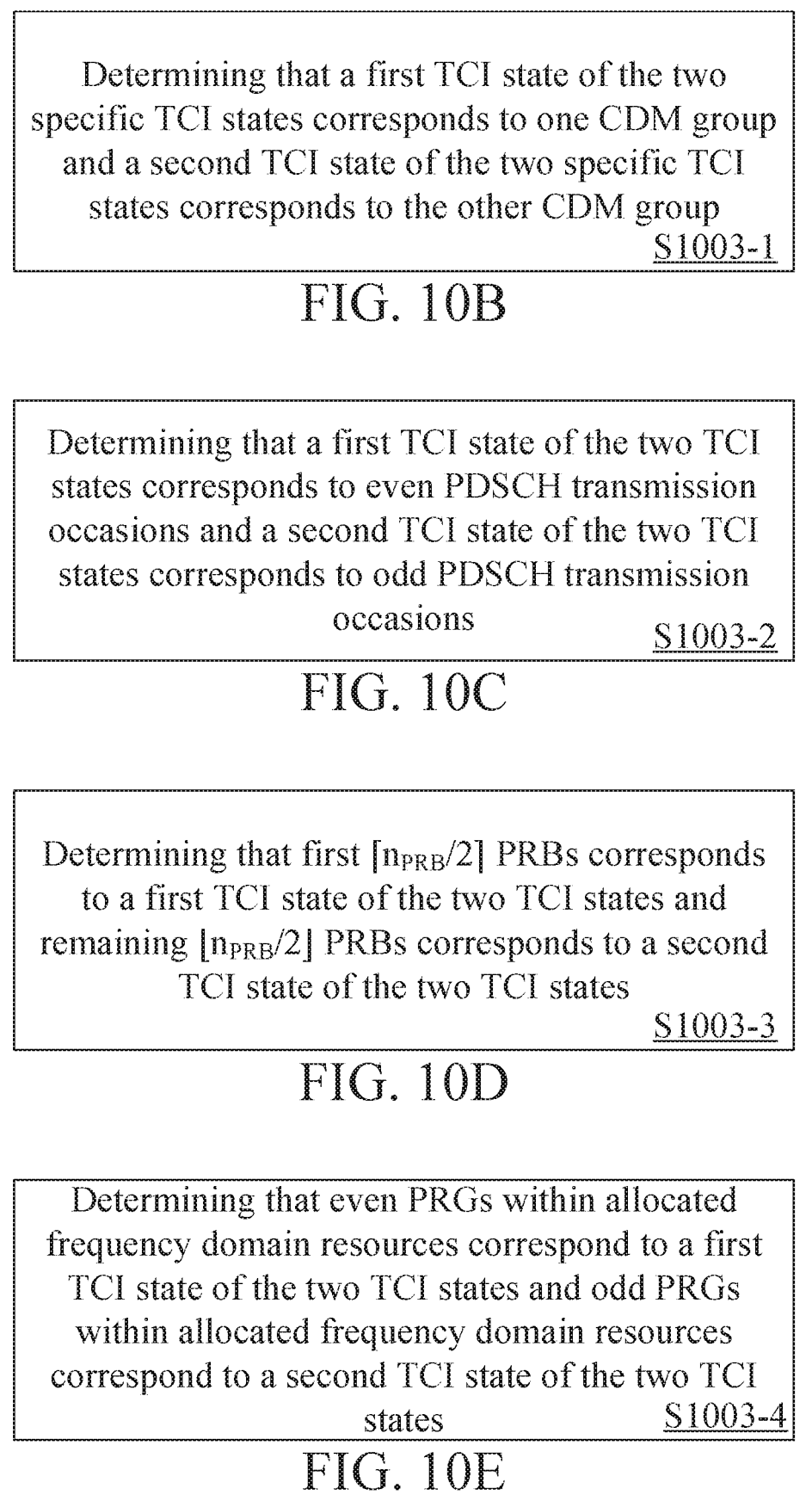

Determining that a first TCI state of the two specific TCI states corresponds to one CDM group and a second TCI state of the two specific TCI states corresponds to the other CDM group

Determining that a first TCI state of the two TCI states corresponds to even PDSCH transmission occasions and a second TCI state of the two TCI states corresponds to odd PDSCH transmission occasions

Determining that first $\lceil n_{PRB}/2 \rceil$ PRBs corresponds to a first TCI state of the two TCI states and remaining $\lfloor n_{PRB}/2 \rfloor$ PRBs corresponds to a second TCI state of the two TCI states

Determining that even PRGs within allocated frequency domain resources correspond to a first TCI state of the two TCI states and odd PRGs within allocated frequency domain resources correspond to a second TCI state of the two TCI states

METHOD AND APPARATUS FOR DOWNLINK TRANSMISSION IN PHYSICAL DOWNLINK CONTROL CHANNEL

TECHNICAL FIELD

Embodiments of the present application generally relate to wireless communication technology, especially to a method and an apparatus for downlink transmission in enhanced physical downlink control channel (e-PDCCH) wherein multiple TCI states are activated for a control resource set (CORESET) in the active BWP in the serving cell.

BACKGROUND

In conventional network, only one transmission configuration indicator (TCI) state is activated for one control resource set (CORESET), and default TCI state used for physical downlink shared channel (PDSCH) or aperiodic channel state information reference signal (AP CSI-RS) is determined by the TCI state applied for the CORESET associated with a monitored search space with the lowest CORESET identity number (e.g., controlResourceSetId) in the latest slot within the active BWP of the serving cell monitored by the UE.

In the network with enhanced physical downlink control channel (e-PDCCH) transmission, a plurality of TCI states are configured for one CORESET, the default TCI states of PDSCH or AP CSI-RS need to be determined according to higher layer configurations.

SUMMARY

Some embodiments of the present application provide a method of a user equipment (UE). The method includes: determining at least one transmission configuration indicator (TCI) state for receiving a physical downlink shared channel (PDSCH) or an aperiodic channel state information reference signal (AP CSI-RS), wherein multiple TCI states are activated for at least one control resource set (CORESET) in an active bandwidth part (BWP) in a serving cell; and receiving the PDSCH or the AP CSI-RS according to the determined at least one TCI state.

Some embodiments of the present application provide an apparatus. The apparatus includes: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the above-mentioned method for wireless communications.

The details of one or more examples are set forth in the accompanying drawings and the description below. Other features, objects, and advantages will be apparent from the description and drawings, and from the claims.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

FIG. 3 illustrates a flow chart of a method for wireless communications according to an embodiment of the present disclosure.

FIG. 4 illustrates a flow chart of a method for wireless communications according to an embodiment of the present disclosure.

FIG. 5 illustrates a flow chart of a method for wireless communications according to an embodiment of the present disclosure.

FIG. 6 illustrates a flow chart of a method for wireless communications according to an embodiment of the present disclosure.

FIG. 7 illustrates a flow chart of a method for wireless communications according to an embodiment of the present disclosure.

FIG. 8 illustrates a flow chart of a method for wireless communications according to an embodiment of the present disclosure.

FIGS. 9A to 9E illustrate flow charts of a method for wireless communications according to an embodiment of the present disclosure.

FIGS. 10A to 10E illustrate flow charts of a method for wireless communications according to an embodiment of the present disclosure.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. Embodiments of the present application may be provided in a network architecture that adopts various service scenarios, for example but is not limited to, 3GPP 3G, long-term evolution (LTE), LTE-Advanced (LTE-A), 3GPP 4G, 3GPP 5G NR (new radio), etc. It is contemplated that along with the 3GPP and related communication technology development, the terminologies recited in the present application may change, which should not affect the principle of the present application.

Figure 1:
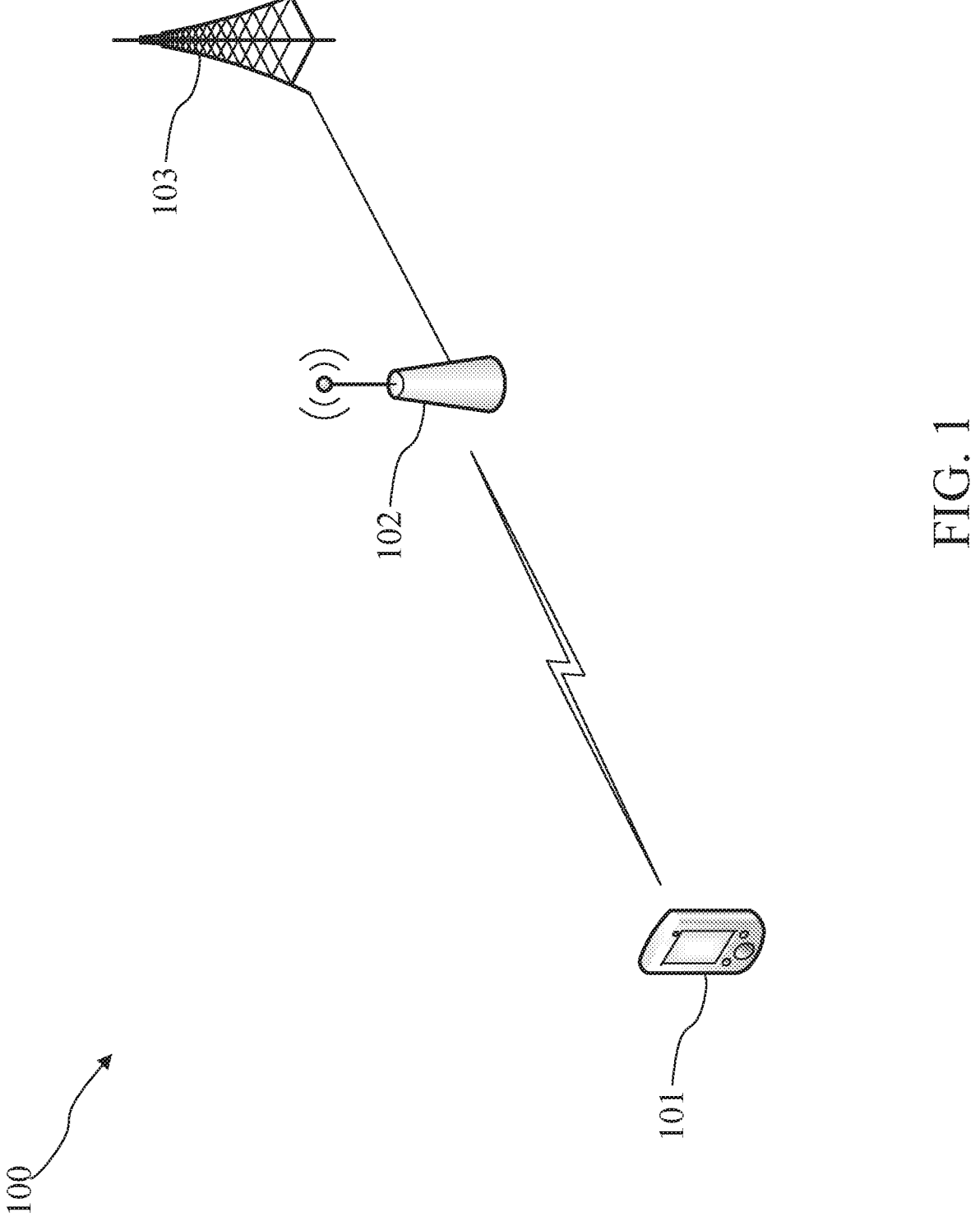
FIG. 1 illustrates a schematic diagram of a wireless communication system in accordance with some embodiments of the present application.

FIG. 1 illustrates a schematic diagram of a wireless communication system 100 in accordance with some embodiments of the present application. The wireless communication system 100 includes a user equipment (UE) 101, transmission reception point (TRP) 102 and a base station (BS) 103. Although a specific number of the UE 101, the TRP 102 and the BS 103 are depicted in FIG. 1, it is contemplated that any number of UE, TRP, BS and core network (CN) may be included in the wireless communication system 100.

The TRP 102 and the BS 103 may be distributed over a geographic region. In certain embodiments of the present application, the BS 103 may be referred to as an access point, an access terminal, a base, a base unit, a macro cell, a Node-B, an evolved Node B (eNB), a gNB, a Home Node-B, a relay node, or a device, or described using other terminology used in the art. The TRP 102 may be referred to as transmission points of the BS 103.

The UE 101 may include, for example, but is not limited to, computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), Internet of Thing (IoT) devices, or the like.

According to some embodiments of the present application, the UE 101 may include, for example, but is not limited to, a portable wireless communication device, a smart phone, a cellular telephone, a flip phone, a device having a subscriber identity module, a personal computer, a selective call receiver, a wireless sensor, a monitoring device, or any other device that is capable of sending and receiving communication signals on a wireless network.

In some embodiments of the present application, the UE 101 may include, for example, but is not limited to, wearable devices, such as smart watches, fitness bands, optical head-mounted displays, or the like. Moreover, the UE 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UE 101 may communicate with the BS 103 via the TRP 102.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

According to some existing agreements (e.g., 3GPP Release 15 and Release 16), only one transmission configuration indicator (TCI) state is activated for one control resource set (CORESET), and default TCI state used for physical downlink shared channel (PDSCH) or aperiodic channel state information reference signal (AP CSI-RS) is determined by the TCI state applied for the CORESET associated with a monitored search space with the lowest CORESET identity number (e.g., controlResourceSetId defined in 3GPP specifications) in the latest slot within the active BWP of the serving cell monitored by the UE. Default TCI states for PDSCH reception or AP CSI-RS reception need to be determined in the scenario that a plurality of TCI states are configured for at least one CORESET.

Accordingly, in the present disclosure, details of determining default TCI states for PDSCH reception or AP CSI-RS reception in the network with e-PDCCH that a plurality of TCI states are configured for at least one CORESET will be introduced. More details on embodiments of the present disclosure will be further described hereinafter.

Figure 2A:
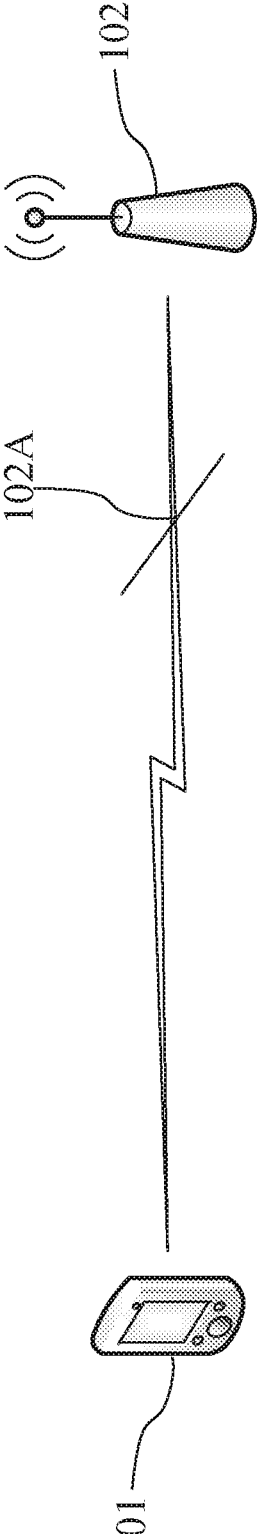
FIG. 2A illustrates a schematic diagram of message transmission in accordance with some embodiments of the present application.

FIG. 2A is a schematic diagram of communication between the UE 101 and the TRP 102 in accordance with some embodiments of the present application. In some network environments, the TRP 102 may transmit a downlink control information (DCI) 102A to the UE 101. After receiving the DCI 102A, the UE 101 may determine at least one TCI state for receiving PDSCH or AP CSI-RS. Then, the UE 101 may receive PDSCH or AP CSI-RS according to the determined at least one TCI state.

Figure 2B:
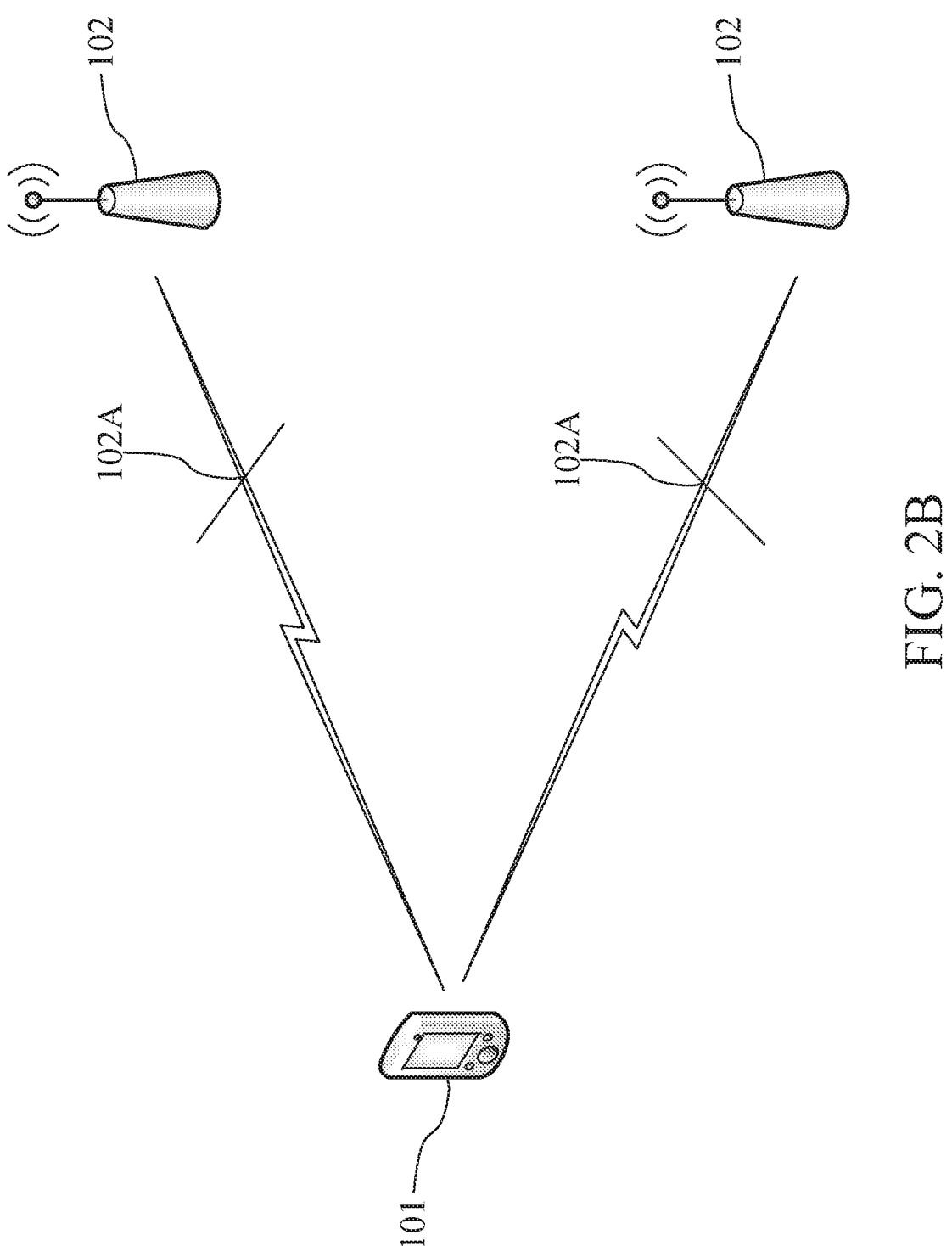
FIG. 2B illustrates a schematic diagram of message transmission in accordance with some embodiments of the present application.

FIG. 2B is a schematic diagram of communication between the UE 101 and two TRPs 102 in accordance with some embodiments of the present application. In some network environments, the TRPs 102 may respectively transmit the DCI 102A to the UE 101. After receiving the DCI 102A, the UE 101 may determine at least one TCI state for receiving PDSCH or AP CSI-RS. Then, the UE 101 may receive PDSCH or AP CSI-RS according to the determined at least one TCI state. In some implementations, the DCIs 102A transmitted from different TRPs 102 may be duplicates of the DCI content. In some implementations, the DCIs 102A transmitted from different TRPs 102 may be different parts of the DCI content.

More specifically, in these embodiments, multiple TCI states may be activated for at least one CORESET in an active bandwidth part (BWP) in a serving cell of the TRP 102(s). In other words, one or more CORESETs in the active BWP in the serving cell of the TRP(s) 102 may be configured with multiple TCI states. It should be noted that the number of the TRP(s) 102 depicted in FIGS. 2A and 2B is intended to be illustrative, not limiting.

In some embodiments, at least one TCI state may be determined for PDSCH reception. In detail, in these embodiments, after receiving the DCI 102A, the UE 101 may calculate a time offset between a reception of the DCI 102A and a PDSCH corresponding to the DCI 102A. Afterward, when:

(1) the time offset is less than a threshold (e.g., timeDurationForQCL defined in 3GPP specifications) and the UE 101 is not configured with a parameter (e.g., higher layer parameter enableTwoDefaultTCIStates defined in 3GPP specifications) which indicates the UE 101 to apply two default TCI states of single-DCI based multi-TRP transmission; or (2) the time offset is less than the threshold (e.g., timeDurationForQCL), the UE 101 is configured with the parameter (e.g., higher layer parameter enableTwoDefaultTCIStates), and no TCI codepoint activated to the UE 101 for PDSCH maps to two TCI states;

the UE 101 may determine a specific TCI state with lowest identity number (e.g., TCI-StateId defined in 3GPP specifications) from a plurality of TCI states which is activated for a specific CORESET, which is associated with a monitored search space, with lowest identify number (e.g., controlResourceSetId) in latest slot within the active BWP of the serving cell monitored by the UE 101. Then, the UE 101 may receive the PDSCH according to reference signals corresponding to the specific TCI state.

In other words, the UE 101 may determine that demodulation reference signal (DM-RS) port(s) of PDSCH of the serving cell is (are) quasi co-located with reference signals with respect to quasi co-location (QCL) parameter associated with the specific TCI state with lowest identity number (e.g., TCI-StateId) used for PDCCH quasi co-location indication of the CORESET, which is associated with the monitored search space, with lowest identity number (e.g., controlResourceSetId) in the latest slot in which one or more CORESETs within the active BWP of the serving cell are monitored by the UE 101.

For example, three CORESETs are configured, which are CORESET #0 to CORESET #2, on the active BWP of the serving cell and media access control-control element (MAC-CE) activates one or more TCI states for each CORE-SET. Particularly, TCI state #10 is activated for CORESET #0, TCI state #15 and TCI state #20 are activated for CORESET #1, and TCI state #3 and TCI state #14 are activated for CORESET #2. DCI #0 transmitted on CORE-SET #0 schedules a PDSCH #0 transmission.

In this example, the UE 101 monitored a DCI #1 on CORESET #1 and a DCI #2 on CORESET #2 in the latest slot. When the UE 101 determines that the time offset between the reception of DCI #0 and PDSCH #0 is less than timeDurationForQCL and the UE 101 is not configured with enableTwoDefaultTCIStates, the UE 101 determines that DM-RS port(s) of PDSCH #0 is (are) quasi co-located with the reference signals with respect to the QCL parameters associated with TCI state #15 which is the TCI state with lowest TCI-StateId used for CORESET #1 with lowest controlResourceSetId in the latest slot monitored by the UE 101.

In some embodiments, at least one TCI state may be determined for PDSCH reception. In detail, in these embodiments, after receiving the DCI 102A, the UE 101 may calculate the time offset between the reception of the DCI 102A and the PDSCH corresponding to the DCI 102A. Afterward, when:

(1) the time offset is less than the threshold (e.g., timeDurationForQCL) and the UE 101 is not configured with the parameter (e.g., higher layer parameter enableTwoDefaultTCIStates) which indicates the UE 101 to apply two default TCI states of single-DCI based multi-TRP transmission; or (2) the time offset is less than the threshold (e.g., timeDurationForQCL), the UE 101 is configured with the parameter (e.g., higher layer parameter enableTwoDefaultTCIStates), and no TCI codepoint activated to the UE 101 for PDSCH maps to two TCI states;

the UE 101 may determine a specific TCI state of a specific CORESET, which is associated with a monitored search space, with lowest identify number (e.g., controlResource-SetId) within the active BWP of the serving cell monitored by the UE 101 among CORESETs configured with one TCI state in latest slot. Then, the UE 101 may receive the PDSCH according to reference signals corresponding to the specific TCI state.

In other words, the UE 101 may determine that DM-RS port(s) of PDSCH of the serving cell is (are) quasi co-located with the reference signals with respect to the QCL parameter associated with the TCI state of the CORESET, which is associated with a monitored search space, with lowest identity number (e.g., controlResourceSetId) within the active BWP of the serving cell monitored by the UE 101 among the CORESETs configured with one TCI state in the latest slot.

For example, three CORESETs are configured, which are CORESET #0 to CORESET #2, on the active BWP of the serving cell and MAC-CE activates one or more TCI states for each CORESET. Particularly, TCI state #10 is activated for CORESET #0, TCI state #15 and TCI state #20 are activated for CORESET #1, and TCI state #3 is activated for CORESET #2. DCI #0 transmitted on CORESET #0 schedules a PDSCH #0 transmission.

In this example, the UE 101 monitored a DCI #1 on CORESET #0, a DCI #2 on CORESET #1 and a DCI #3 on CORESET #2 in the latest slot. When the UE 101 determines that the time offset between the reception of DCI #0 and PDSCH #0 is less than timeDurationForQCL, the UE 101 is configured with enableTwoDefaultTCIStates and no TCI codepoint containing two TCI states, the UE 101 determines that DM-RS port(s) of PDSCH #0 is (are) quasi co-located with the reference signals in TCI state #10 used for CORESET #0 with lowest controlResourceSetId among the CORESETs configured with one TCI state (i.e., CORE-SET #0 and CORESET #2) monitored by the UE 101 in the latest slot.

In some embodiments, at least one TCI state may be determined for AP CSI-RS reception. In detail, in these embodiments, the DCI 102A may be used for triggering an AP CSI-RS transmission. After receiving the DCI 102A, the UE 101 may calculate an offset between between last symbol of last PDCCH, which carries the DCI 102A, and first symbol of AP CSI-RS resource. The AP CSI-RS resource may be in a non-zero power channel state information reference signal (NZP-CSI-RS) resource set (e.g., NZP-CSI-RS-ResourceSet defined in 3GPP specifications) configured without a parameter of tracking reference information (e.g., higher layer parameter trs-Info defined in 3GPP specifications). Afterward, when the offset is less than a threshold (e.g., a UE reported beamSwitchTiming defined in 3GPP specifications) and in the same symbols of the AP CSI-RS resource are without any other downlink signal, which refers to PDSCH scheduled with another offset larger than or equal to the threshold (e.g., timeDurationForQCL), having an indicated TCI state, the UE 101 may determine a specific TCI state with lowest identity number (e.g., TCI-StateId) from a plurality of TCI states which is activated for a specific CORESET, which is associated with a monitored search space, with lowest identify number (e.g., controlRe-sourceSetId) in latest slot within the active BWP of the serving cell monitored by the UE 101. Then, the UE 101 may receive the AP CSI-RS according to reference signals corresponding to the specific TCI state.

In other words, when receiving the AP CSI-RS, the UE 101 may apply a QCL parameter associated with the specific TCI state with lowest identity number (e.g., TCI-StateId) activated for the CORESET, which is associated with a monitored search space, with lowest identity number (e.g., controlResourceSetId) in the latest slot in which one or more CORESETs within the active BWP of the serving cell of are monitored by the UE 101.

For example, three CORESETs are configured, which are CORESET #0 to CORESET #2, on the active BWP of the serving cell and MAC-CE activates one or more TCI states for each CORESET. Particularly, TCI state #10 and TCI state #54 are activated for CORESET #0, TCI state #15 and TCI state #40 are activated for CORESET #1, and TCI state #3 and TCI state #30 are activated for CORESET #2. DCI #0 transmitted on CORESET #1 triggers an AP CSI-RS resource #0 in NZP-CSI-RS-ResourceSet #0 configured without higher layer parameter trs-Info.

In this example, the UE 101 monitored a DCI #1 on CORESET #0 and a DCI #2 on CORESET #1 in the latest slot. When the UE 101 determines that the offset between the last symbol of DCI #0 and the first symbol of CSI-RS #0 is less than beamSwitchTiming and there is no other downlink signal transmission indicated with TCI state in the same symbols as the transmission of CSI-RS #0, the UE 101 applies the QCL parameter associated with TCI state #10 to receive CSI-RS #0 since TCI state #10 is the TCI state with lowest TCI-StateId used for CORESET #0 with lowest controlResourceSetId in the latest slot monitored by the UE 101.

In some embodiments, at least one TCI state may be determined for AP CSI-RS reception. In detail, in these embodiments, the DCI 102A may be used for triggering an AP CSI-RS transmission. After receiving the DCI 102A, the UE 101 may calculate an offset between between last symbol of last PDCCH, which carries the DCI 102A, and first symbol of AP CSI-RS resource. The AP CSI-RS resource may be in a NZP-CSI-RS resource set (e.g., NZP-CSI-RS-ResourceSet) configured without the parameter of tracking reference information (e.g., higher layer parameter trs-Info). Afterward, when the offset is less than a threshold (e.g., beamSwitchTiming) and in the same symbols of the AP CSI-RS resource are without any other downlink signal, which refers to PDSCH scheduled with another offset larger than or equal to the threshold (e.g., timeDurationForQCL), having an indicated TCI state, the UE 101 may determine a specific TCI state of a specific CORESET, which is associated with a monitored search space, with lowest identify number (e.g., controlResourceSetId) within the active BWP of the serving cell monitored by the UE 101 among CORESETs configured with one TCI state in latest slot. Then, the UE 101 may receive the AP CSI-RS according to reference signals corresponding to the specific TCI state.

In other words, when receiving the AP CSI-RS, the UE 101 may apply the QCL parameter associated with the specific TCI state of the CORESET, which is associated with a monitored search space, with lowest identity number (e.g., controlResourceSetId) within the active BWP of the serving cell monitored by the UE 101 in the latest slot among the CORESETs configured with one TCI state.

For example, three CORESETs are configured, which are CORESET #0 to CORESET #2, on the active BWP of the serving cell and MAC-CE activates one or more TCI states for each CORESET. Particularly, TCI state #10 and TCI state #54 are activated for CORESET #0, TCI state #15 is activated for CORESET #1, and TCI state #3 and TCI state #30 are activated for CORESET #2. DCI #0 transmitted on CORESET #1 triggers an AP CSI-RS resource #0 in NZP-CSI-RS-ResourceSet #0 configured without higher layer parameter trs-Info.

In this example, the UE 101 monitored a DCI #1 on CORESET #0 and a DCI #2 on CORESET #1 in the latest slot. When the UE 101 determines that the offset between the last symbol of DCI #0 and the first symbol of CSI-RS #0 is less than beamSwitchTiming and there is no other downlink signal transmission with indicated TCI state in the same symbols as the transmission of CSI-RS #0, the UE 101 applies the QCL parameter associated with TCI state #15 to receive CSI-RS #0 since only CORESET #1 is configured with one TCI state (i.e., among CORESET #0 and CORESET #1) which the UE 101 monitored in the latest slot.

In some embodiments, at least one TCI state may be determined for PDSCH reception. In detail, in these embodiments, after receiving the DCI 102A, the UE 101 may calculate a time offset between the reception of the DCI 102A and the PDSCH corresponding to the DCI 102A. Afterward, when:

(1) the time offset is equal to or greater than the threshold (e.g., timeDurationForQCL), a DCI format of the DCI 102A is without TCI field, and the UE 101 is not configured with a parameter (e.g., higher layer parameter enableTwoDefaultTCIStates) which indicates the UE 101 to apply two default TCI states of single-DCI based multi-TRP transmission; or (2) the time offset is equal to or greater than the threshold (e.g., timeDurationForQCL), the DCI format of the DCI 102A is without TCI field, the UE 101 is configured with the parameter (e.g., higher layer parameter enableTwoDefaultTCIStates), and no TCI codepoint activated to the UE 101 for PDSCH maps to two TCI states; the UE 101 may determine a specific TCI state with lowest identity number (e.g., TCI-StateId) from a plurality of TCI states which is activated for a specific CORESET used for transmitting the DCI 102A. Then, the UE 101 may receive the PDSCH according to reference signals corresponding to the specific TCI state.

In some embodiments, at least one TCI state may be determined for PDSCH reception. In detail, in these embodiments, after receiving the DCI 102A, the UE 101 may calculate a time offset between the reception of the DCI 102A and the PDSCH corresponding to the DCI 102A. Afterward, when the time offset is equal to or greater than a threshold (e.g., timeDurationForQCL), a format of the DCI 102A is without TCI field, and the UE 101 is configured with a parameter (e.g., higher layer parameter enableTwoDefault-TCIStates) which indicates the UE 101 to apply two default TCI states and at least one TCI codepoint activated to the UE 101 for PDSCH maps to two TCI states, the UE 101 may determine two specific TCI states corresponding to lowest TCI codepoint among TCI codepoints, which are activated to the UE 101 for PDSCH, containing two TCI states. Then, the UE 101 may receive the PDSCH according to reference signals corresponding the two specific TCI states.

In some implementations, the format of the DCI 102A being without TCI field may be configured by having no TCI present parameter for the CORESET used for transmitting the DCI 102A (e.g., higher layer parameter Tci-PresentIn-DCI or higher layer parameter tci-PresentInDCI-ForFormat1_2 defined in 3GPP specifications)), but at least one TCI present parameter (e.g., higher layer parameter Tci-PresentInDCI or higher layer parameter tci-PresentInDCI-ForFormat1_2) is configured for other CORESET(s) configured in the active BWP of the serving cell. In some implementations, the two specific TCI states may include a spatial receiver parameter (e.g., parameter QCL-TypeD defined in 3GPP specifications), and the UE 101 is capable of receiving PDSCH with different TCI states including the spatial receiver parameter simultaneously.

In other words, when higher layer parameter Tci-PresentInDCI is set to "enabled" or higher layer parameter tci-PresentInDCI-ForFormat1_2 is configured for at least one CORESET in the activated BWP of the serving cell, the UE 101 may receive MAC-CE for activating TCI state for PDSCH. When a PDSCH is scheduled by the DCI 102A not having TCI field present, the time offset between the reception of the DCI 102A and the corresponding PDSCH is equal to or greater than the threshold (e.g., timeDurationForQCL), and at least one TCI codepoint activated to the UE 101 for PDSCH maps to two TCI states, the UE 101 may determine that DM-RS ports of PDSCH of the serving cell are quasi co-located with the reference signals with respect to the QCL parameter associated with two specific TCI states corresponding to lowest TCI codepoint among TCI codepoints containing two TCI states. Further, if the two specific TCI states include the spatial receiver parameter (e.g., parameter QCL-TypeD), the UE 101 is capable of receiving PDSCH with different TCI states including the spatial receiver parameter simultaneously.

In some implementations, time domain resource assignment (TDRA) field in the DCI 102A may indicate an entry in a PDSCH time domain allocation list (e.g., pdsch-Time-DomainAllocationList defined in 3GPP specifications) not containing a repetition number of PDSCH transmission (e.g., RepNum16 defined in 3GPP specifications), and DM-RS ports indicated in the DCI 102A are within two code division multiplexing (CDM) groups. Accordingly, the UE 101 may determine that a first TCI state of the two specific TCI states corresponds to one CDM group of a first DM-RS port indicated by the DCI 102A, and a second TCI state of the two specific TCI states corresponds to the other CDM group.

In some implementations, TDRA field in the DCI 102A may indicate an entry in the PDSCH time domain allocation list (e.g., pdsch-TimeDomainAllocationList) containing the repetition number of PDSCH transmission (e.g., RepNum16), or the UE 101 may be configured by a parameter of repetition scheme (e.g., higher layer parameter RepSchemeEnabler defined in 3GPP specifications) as time division multiplexing scheme (e.g., TDMSchemeA defined in 3GPP specifications) and DM-RS ports indicated in the DCI 102A are within one CDM group. Accordingly, the UE 101 may determine that a first TCI state of the two TCI states corresponds to even PDSCH transmission occasions and a second TCI state of the two TCI states corresponds to odd PDSCH transmission occasions.

In some implementations, the UE 101 may be configured by the parameter of repetition scheme (e.g., higher layer parameter RepSchemeEnabler) as first frequency division multiplexing scheme (e.g., TDMSchemeA) or second frequency division multiplexing scheme (e.g., TDMSchemeB defined in 3GPP specifications), DM-RS ports are indicated within one CDM group, and precoding granularity may be determined as wideband. Accordingly, the UE 101 may determine that first $$\left\lceil \frac{n_{PRB}}{2} \right\rceil$$

physical resource blocks (PRBs) correspond to a first TCI state of the two specific TCI states and remaining $$\left\lfloor \frac{n_{PRB}}{2} \right\rfloor$$

PRBs correspond to a second TCI state of the two specific TCI states. Where $n_{PRB}$ is the total number of allocated PRBs for the UE 101.

In some implementations, the UE 101 may be configured by the parameter of repetition scheme (e.g., higher layer parameter RepSchemeEnabler) as first frequency division multiplexing scheme (e.g., TDMSchemeA) or second frequency division multiplexing scheme (e.g., TDMSchemeB), DM-RS ports are indicated within one CDM group, and precoding granularity may be determined as one of the values of among {2, 4}. Accordingly, the UE 101 may determine that even precoding resource block group (PRGs) within allocated frequency domain resources correspond to a first TCI state of the two specific TCI states and odd PRGs within allocated frequency domain resources correspond to a second TCI state of the two specific TCI states.

For example, t three CORESETs are configured, which are CORESET #0 to CORESET #2, on the active BWP of the serving cell and MAC-CE activates TCI states containing QCL-TypeD for PDSCH for up to eight TCI codepoints as following table 1. The UE 101 is capable of receiving PDSCH with different TCI states including QCL-TypeD simultaneously. DCI #0 transmitted on CORESET #0 schedules a PDSCH #0 transmission and DCI #0 has no TCI field. Tci-PresentInDCI is set to "disabled" and tci-PresentInDCI-ForFormat1_2 is not configured for CORESET #0. Tci-PresentInDCI is set to "enabled" or tci-PresentInDCI-For-Format1_2 is configured for the other CORESETs which are CORESET #1 and CORESET #2.

In this example, when the time offset between the reception of DCI #0, PDSCH #0 is greater than timeDuration-ForQCL, the TDRA field in DCI #0 indicates the UE 101 an entry in pdsch-TimeDomainAllocationList not containing RepNumR16, and DM-RS ports indicated to the UE 101 are DM-RS port #0 and DM-RS port #2 that DM-RS port #0 is in CDM group #0 and DM-RS port #2 is in CDM group #1, the UE 101 determines TCI state #12 corresponds to DMRS ports in CDM group #0 and TCI state #20 corresponds to DMRS ports in CDM group #1 since TCI state #12 and TCI state #20 correspond to lowest TCI codepoint 001 among the TCI codepoints 001, 010 and 101 containing two different TCI states.

TABLE 1

| TCI state activated for PDSCH by MAC-CE for the active BWP of the serving cell | |
| --- | --- |
| TCI codepoint | TCI state(s) |
| 000 | TCI-state#10 |
| 001 | TCI-state#12 and TCI-state#20 |
| 010 | TCI-state#20 and TCI-state#38 |
| 011 | TCI-state#38 |
| 100 | TCI-state#48 |
| 101 | TCI-state#52 and TCI-state#55 |
| 110 | TCI-state#55 |
| 111 | TCI-state#80 |

In some embodiments, at least one TCI state is determined for PDSCH reception. In detail, in these embodiments, after receiving the DCI 102A, the UE 101 may calculate a time offset between a reception of the DCI 102A and a PDSCH corresponding to the DCI 102A. Afterward, when the time offset is equal to or greater than a threshold (e.g., timeDurationForQCL), a DCI format of the DCI 102A is without TCI field, and a plurality of TCI states is activated for a specific CORESET used for transmitting the DCI 102A, the UE 101 may determine two specific TCI states of the specific CORESET. Then, the UE 101 may receive the PDSCH according to reference signals corresponding to the two specific TCI states. In some implementations, the two specific TCI states may include the spatial receiver parameter (e.g., parameter QCL-TypeD), and the UE 101 may be capable of receiving PDSCH with different TCI states including the spatial receiver parameter simultaneously.

In other words, in e-PDCCH transmission, when two or more TCI states are activated for a CORESET used for the PDCCH transmission, the PDSCH scheduled by a DCI without TCI field present could also be transmitted from multiple TRPs and the UE 101 may determine that DM-RS ports of PDSCH are quasi co-located with the reference signals with respect to the QCL parameter whichever is applied for the CORESET used for the PDCCH transmission for the UE 101. When the two specific TCI states include the spatial receiver parameter (e.g., parameter QCL-TypeD), the UE 101 is with the capability of simultaneous reception with different spatial receiver parameter (e.g., parameter QCL-TypeD).

In some implementations, TDRA field in the DCI 102A may indicate an entry in a PDSCH time domain allocation list (e.g., pdsch-TimeDomainAllocationList) not containing a repetition number of PDSCH transmission (e.g., Rep-Num16), and DM-RS ports indicated in the DCI 102A are within two CDM groups. Accordingly, the UE 101 may determine that a first TCI state of the two specific TCI states corresponds to one CDM group of a first DM-RS port indicated by the DCI 102A and a second TCI state of the two specific TCI states corresponds to the other CDM group.

In some implementations, TDRA field in the DCI 102A may indicate an entry in the PDSCH time domain allocation list (e.g., pdsch-TimeDomainAllocationList) containing the repetition number of PDSCH transmission (e.g., Rep-Num16), or the UE 101 may be configured by a parameter of repetition scheme (e.g., higher layer parameter Rep-SchemeEnable) as time division multiplexing scheme (e.g., TDMSchemeA) and DM-RS ports indicated in the DCI 102A are within one CDM group. Accordingly, the UE 101 may determine that a first TCI state of the two TCI states corresponds to even PDSCH transmission occasions and a second TCI state of the two TCI states corresponds to odd PDSCH transmission occasions.

In some implementations, the UE 101 may be configured by the parameter of repetition scheme (e.g., higher layer parameter RepSchemeEnabler) as first frequency division multiplexing scheme (e.g., TDMSchemeA) or second frequency division multiplexing scheme (e.g., TDMSchemeB), DM-RS ports may be indicated within one CDM group, and precoding granularity may be determined as wideband. Accordingly, the UE 101 may determine that first $$\left\lceil \frac{n_{PRB}}{2} \right\rceil$$

physical resource blocks (PRBs) correspond to a first TCI state of the two specific TCI states and remaining $$\left\lfloor \frac{n_{PRB}}{2} \right\rfloor$$

PRBs correspond to a second TCI state of the two specific TCI states. Where $n_{PRB}$ is the total number of allocated PRBs for the UE 101.

In some implementations, the UE 101 may be configured by the parameter of repetition scheme (e.g., higher layer parameter RepSchemeEnabler) as first frequency division multiplexing scheme (e.g., TDMSchemeA) or second frequency division multiplexing scheme (e.g., TDMSchemeB), DM-RS ports may be indicated within one CDM group, and precoding granularity may be determined as one of the values of among {2, 4}. Accordingly, the UE 101 may determine that even precoding resource block group (PRGs) within allocated frequency domain resources correspond to a first TCI state of the two specific TCI states and odd PRGs within allocated frequency domain resources correspond to a second TCI state of the two specific TCI states.

For example, three CORESETs are configured, which are CORESET #0 to CORESET #2, on the active BWP of the serving cell and MAC-CE activates two TCI states for each CORESET. TCI state #10 and TCI state #50 are activated for CORESET #0, TCI state #15 and TCI state #20 are activated for CORESET #1, and TCI state #3 and TCI state #14 are activated for CORESET #2. DCI #0 transmitted on CORE-SET #2 schedules a PDSCH #0 transmission. Tci-PresentIn- DCI and tci-PresentInDCI-ForFormat1_2 are both not configured for all CORESETs #0 to #2.

In this example, when the time offset between the reception of DCI #0 and PDSCH #0 is greater than timeDura-tionForQCL, TDRA field in DCI #0 indicates the UE 101 an entry in pdsch-TimeDomainAllocationList containing RepNumR16 which equals to number four, the UE 101 would apply TCI state #3 to the first and the third PDSCH transmission occasions and applies TCI state #14 to the second and the fourth PDSCH transmission occasions since TCI state #3 and TCI state #14 are the TCI states of the CORESET used for transmitting DCI #0.

FIG. 3 illustrates a flow chart of a method for wireless communications in accordance with some embodiments of the present application. Referring to FIG. 3, method 300 is performed by a UE (e.g., UE 101) in some embodiments of the present application.

In some embodiments, operation S301 is executed to determine, by the UE, at least one TCI state for receiving a PDSCH or an AP CSI-RS. In these embodiments, multiple TCI states are activated for at least one CORESET in active BWP in serving cell. Operation S302 is executed to receive, by the UE, the PDSCH or the AP CSI-RS according to the determined at least one TCI state.

FIG. 4 illustrates a flow chart of a method for wireless communications in accordance with some embodiments of the present application. Referring to FIG. 4, method 400 is performed by a UE (e.g., UE 101) in some embodiments of the present application.

In some embodiments, operation S401 is executed to calculate, by the UE, a time offset between a reception of a DCI and a PDSCH corresponding to the DCI. Afterward, when:

(1) the time offset is less than a threshold (e.g., timeDu-rationForQCL) and the UE is not configured with a parameter (e.g., higher layer parameter enableTwoDe-faultTCIStates) which indicates the UE to apply two default TCI states of single-DCI based multi-TRP transmission; or (2) the time offset is less than the threshold (e.g., time-DurationForQCL), the UE is configured with the parameter (e.g., higher layer parameter enableTwoDe-faultTCIStates), and no TCI codepoint activated to the UE for PDSCH maps to two TCI states;

operation S402 is executed to determine, by the UE, a specific TCI state with lowest identity number (e.g., TCI-StateId) from a plurality of TCI states which is activated for a specific CORESET, which is associated with a monitored search space, with lowest identify number (e.g., controlRe-sourceSetId) in latest slot within the active BWP of the serving cell monitored by the UE. Operation S403 is executed to receive, by the UE, the PDSCH according to reference signals corresponding to the specific TCI state.

FIG. 5 illustrates a flow chart of a method for wireless communications in accordance with some embodiments of the present application. Referring to FIG. 5, method 500 is performed by a UE (e.g., UE 101) in some embodiments of the present application.

In some embodiments, operation S501 is executed to calculate, by the UE, a time offset between a reception of a DCI and a PDSCH corresponding to the DCI. Afterward, when:

(1) the time offset is less than a threshold (e.g., timeDu-rationForQCL) and the UE is not configured with a parameter (e.g., higher layer parameter enableTwoDefaultTCIStates) which indicates the UE to apply two default TCI states of single-DCI based multi-TRP transmission; or (2) the time offset is less than the threshold (e.g., time-DurationForQCL), the UE is configured with the parameter (e.g., higher layer parameter enableTwoDe-faultTCIStates), and no TCI codepoint activated to the UE for PDSCH maps to two TCI states;

operation S502 is executed to determine, by the UE, a specific TCI state of a specific CORESET, which is associated with a monitored search space, with lowest identify number (e.g., controlResourceSetId)within the active BWP of the serving cell monitored by the UE among CORESETs configured with one TCI state in latest slot. Operation S503 is executed to receive, by the UE, the PDSCH according to reference signals corresponding to the specific TCI state.

FIG. 6 illustrates a flow chart of a method for wireless communications in accordance with some embodiments of the present application. Referring to FIG. 6, method 600 is performed by a UE (e.g., UE 101) in some embodiments of the present application.

In some embodiments, operation S601 is executed to calculate, by the UE, an offset between last symbol of last PDCCH, which carries a DCI triggering an AP CSI-RS transmission, and first symbol of AP CSI-RS resource. The AP CSI-RS resource may be in a NZP-CSI-RS resource set (e.g., NZP-CSI-RS-ResourceSet) configured without a parameter of tracking reference information (e.g., higher layer parameter trs-Info).

Afterward, when the offset is less than a threshold (e.g., beamSwitchTiming) and in the same symbols of the AP CSI-RS resource are without any other downlink signal, which refers to PDSCH scheduled with another offset larger than or equal to the threshold (e.g., timeDurationForQCL), having an indicated TCI state, operation S602 is executed to determine, by the UE, a specific TCI state with lowest identity number (e.g., TCI-StateId) from a plurality of TCI states which is activated for a specific CORESET, which is associated with a monitored search space, with lowest identify number (e.g., controlResourceSetID) in latest slot within the active BWP of the serving cell monitored by the UE. Operation S603 is executed to receive, by the UE, the AP CSI-RS according to reference signals corresponding to the specific TCI state.

FIG. 7 illustrates a flow chart of a method for wireless communications in accordance with some embodiments of the present application. Referring to FIG. 7, method 700 is performed by a UE (e.g., UE 101) in some embodiments of the present application.

In some embodiments, operation S701 is executed to calculate, by the UE, an offset between between last symbol of last PDCCH, which carries a DCI triggering an AP CSI-RS transmission, and first symbol of AP CSI-RS resource. The AP CSI-RS resource may be in a NZP-CSI-RS resource set (e.g., NZP-CSI-RS-ResourceSet) configured without a parameter of tracking reference information (e.g., higher layer parameter trs-Info). Afterward, when the offset is less than a threshold (e.g., beamSwitchTiming) and in the same symbols of the AP CSI-RS resource are without any other downlink signal, which refers to PDSCH scheduled with another offset larger than or equal to the threshold (e.g., timeDurationForQCL), having an indicated TCI state, operation S702 is executed to determine, by the UE, a specific TCI state of a specific CORESET, which is associated with a monitored search space, with lowest identify number (e.g., controlResourceSetId) within the active BWP of the serving cell monitored by the UE among CORESETs configured with one TCI state in latest slot. Operation S703 is executed to receive, by the UE, the AP CSI-RS according to reference signals corresponding to the specific TCI state.

FIG. 8 illustrates a flow chart of a method for wireless communications in accordance with some embodiments of the present application. Referring to FIG. 8, method 800 is performed by a UE (e.g., UE 101) in some embodiments of the present application.

In some embodiments, operation S801 is executed to calculate, by the UE, a time offset between a reception of a DCI and a PDSCH corresponding to the DCI. Afterward, when:

(1) the time offset is equal to or greater than the threshold (e.g., timeDurationForQCL), a DCI format of the DCI is without TCI field, and the UE is not configured with a parameter (e.g., higher layer parameter enableTwo-DefaultTCIStates) which indicates the UE to apply two default TCI states of single-DCI based multi-TRP transmission; or (2) the time offset is equal to or greater than the threshold (e.g., timeDurationForQCL), the DCI format of the DCI is without TCI field, the UE is configured with the parameter (e.g., higher layer parameter enableTwoDe-faultTCIStates), and no TCI codepoint activated to the UE for PDSCH maps to two TCI states;

operation S802 is executed to determine, by the UE, a specific TCI state with lowest identity number (e.g., TCI-StateId) from a plurality of TCI states which is activated for a specific CORESET used for transmitting the DCI. Operation S803 is executed to receive, by the UE, the PDSCH according to reference signals corresponding to the specific TCI state.

Figure 9A:
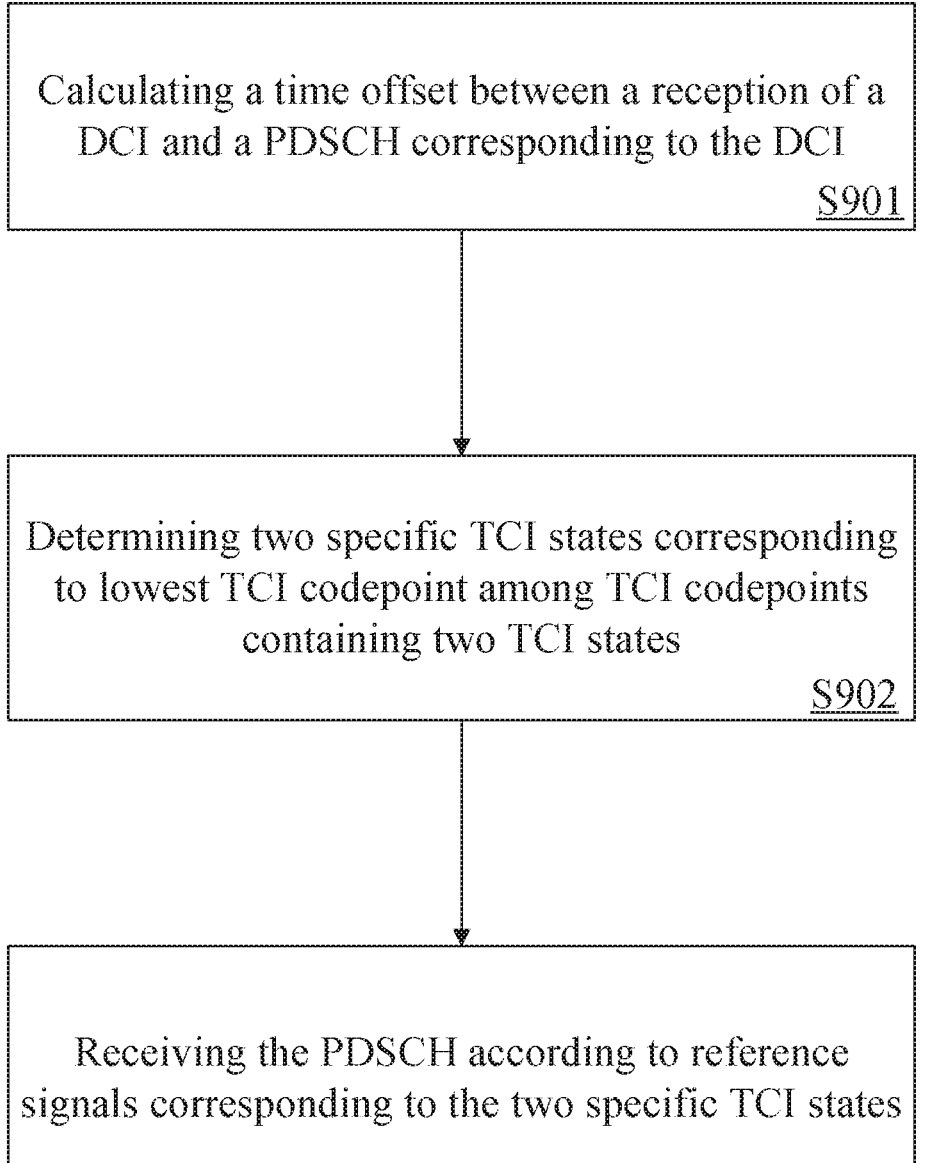

FIG. 9A illustrates a flow chart of a method for wireless communications in accordance with some embodiments of the present application. Referring to FIG. 9A, method 900 is performed by a UE (e.g., UE 101) in some embodiments of the present application.

In some embodiments, operation S901 is executed to calculate, by the UE, a time offset between a reception of a DCI and a PDSCH corresponding to the DCI. Afterward, when the time offset is equal to or greater than a threshold (e.g., timeDurationForQCL), a DCI format of the DCI is without TCI field, and the UE is configured with a parameter (e.g., higher layer parameter enableTwoDefaultTCIStates) which indicates the UE to apply two default TCI states and at least one TCI codepoint activated to the UE for PDSCH maps to two TCI states, operation S902 is executed to determine, by the UE, two specific TCI states corresponding to lowest TCI codepoint among TCI codepoints, which are activated to the UE for PDSCH, containing two TCI states.

Operation S903 is executed to receive, by the UE, the PDSCH according to reference signals corresponding the two specific TCI states. In some implementations, the format of the DCI being without TCI field may be configured by no TCI present parameter for the CORESET used for transmitting the DCI (e.g., higher layer parameter Tci-PresentInDCI or higher layer parameter tci-PresentInDCI-ForFormat1_2 but at least one TCI present parameter(e.g., higher layer parameter Tci-PresentInDCI or higher layer parameter tci-PresentInDCI-ForFormat1_2) is configured for other CORESET(s) configured in the active BWP of the serving cell. In some implementations, the two specific TCI states may include a spatial receiver parameter (e.g., parameter of QCL-TypeD), and the UE may be capable of receiving PDSCH with different TCI states including the spatial receiver parameter simultaneously.

In some implementations, TDRA field in the DCI may indicate an entry in a PDSCH time domain allocation list (e.g., pdsch-TimeDomainAllocationList) not containing a repetition number of PDSCH transmission (e.g., Rep-Num16), and DM-RS ports indicated in the DCI are within two CDM groups. Accordingly, please refer to FIG. 9B, in these implementations, the method may further include operation S903-1. Operation S903-1 is executed to determine, by the UE, that a first TCI state of the two specific TCI states corresponds to one CDM group of a first DM-RS port indicated by the DCI and a second TCI state of the two specific TCI states corresponds to the other CDM group.

In some implementations, TDRA field in the DCI may indicate an entry in the PDSCH time domain allocation list (e.g., pdsch-TimeDomainAllocationList) containing the repetition number of PDSCH transmission (e.g., RepNum16), or the UE may be configured by a parameter of repetition scheme (e.g., higher layer parameter RepSchemeEnabler) as for time division multiplexing scheme (e.g., TDMSchemeA), and DM-RS ports indicated in the DCI 102A are within one CDM group. Accordingly, please refer to FIG. 9C, in these implementations, the method may further include operation S903-2. Operation S903-2 is executed to determine, by the UE, that a first TCI state of the two TCI states corresponds to even PDSCH transmission occasions and a second TCI state of the two TCI states corresponds to odd PDSCH transmission occasions.

In some implementations, the UE may be configured by the parameter of repetition scheme (e.g., higher layer parameter RepSchemeEnabler) as first frequency division multiplexing scheme (e.g., TDMSchemeA) or second frequency division multiplexing scheme (e.g., TDMSchemeB), DM-RS ports indicated are within one CDM group, and precoding granularity may be determined as wideband. Accordingly, please refer to FIG. 9D, in these implementations, the method may further include operation S903-3 4. Operation S903-3 is executed to determine, by the UE, that first $$\left\lceil \frac{n_{PRB}}{2} \right\rceil$$

PRBs correspond to a first TCI state of the two specific TCI states and remaining $$\left\lfloor \frac{n_{PRB}}{2} \right\rfloor$$

PRBs correspond to a second TCI state of the two specific TCI states. Where $n_{PRB}$ is the total number of allocated PRBs for the UE.

In some implementations, the UE may be configured by the parameter of repetition scheme (e.g., higher layer parameter RepSchemeEnabler) as first frequency division multiplexing scheme (e.g., TDMSchemeA) or second frequency division multiplexing scheme (e.g., TDMSchemeB), DM-RS ports indicated are within one CDM group, and precoding granularity may be determined as one of the values among {2, 4}. Accordingly, please refer to FIG. 9E, in these implementations, the method may further include operation S903-4. Operation S903-4 is executed to determine, by the UE, that even PRGs within allocated frequency domain resources correspond to a first TCI state of the two specific TCI states and odd PRGs within allocated frequency domain resources correspond to a second TCI state of the two specific TCI states.

Figure 10A:
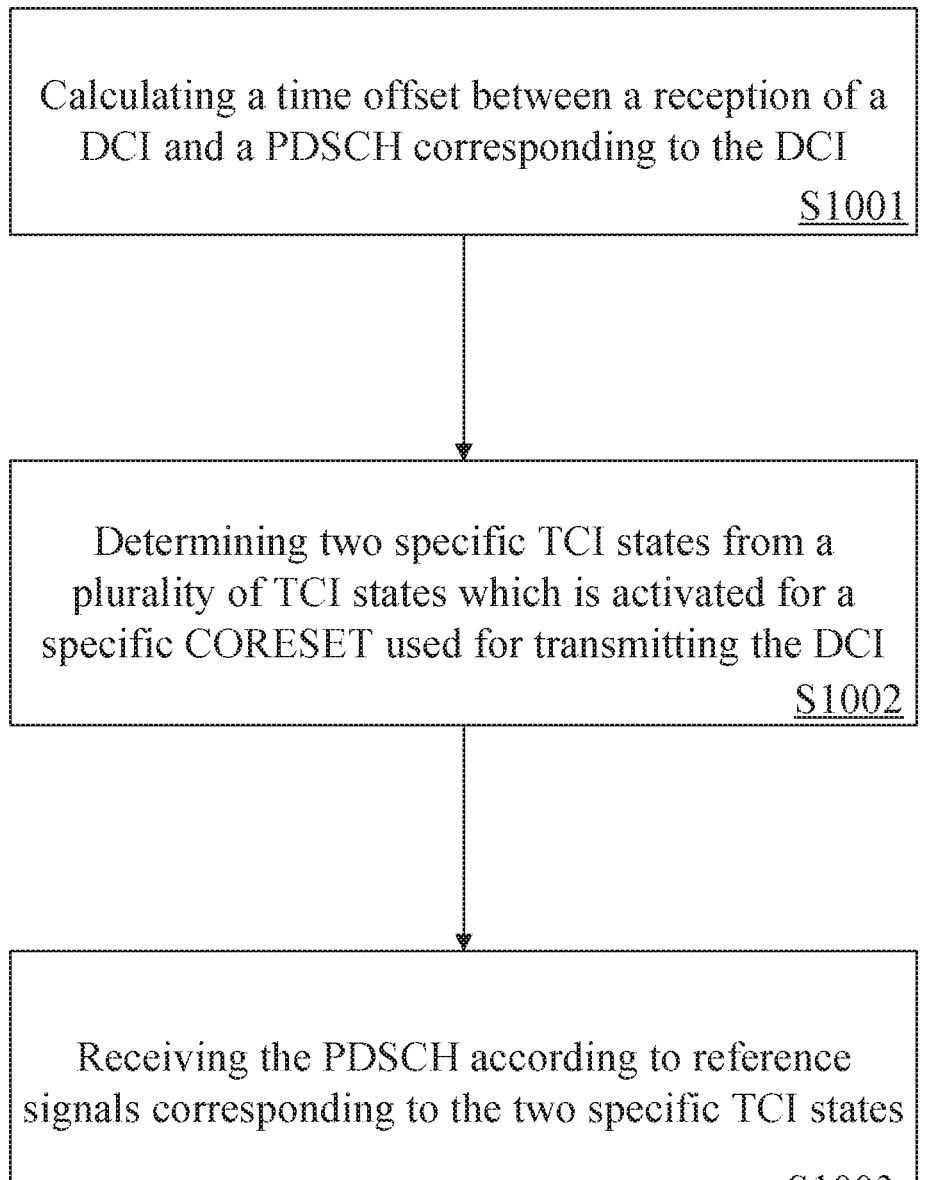

FIG. 10A illustrates a flow chart of a method for wireless communications in accordance with some embodiments of the present application. Referring to FIG. 10A, method 1000 is performed by a UE (e.g., UE 101) in some embodiments of the present application.

In some embodiments, operation S1001 is executed to calculate, by the UE, a time offset between a reception of a DCI and a PDSCH corresponding to the DCI. Afterward, when the time offset is equal to or greater than a threshold (e.g., timeDurationForQCL), a DCI format of the DCI is without TCI field, and a plurality of TCI states is activated for a specific CORESET used for transmitting the DCI, operation S1002 is executed to determine, by the UE, two specific TCI states of the specific CORESET.

Operation S1003 is executed to receive, by the UE, the PDSCH according to reference signals corresponding the two specific TCI states. In some implementations, the two specific TCI states may include a spatial receiver parameter (e.g., parameter QCL-TypeD), and the UE may be capable of receiving PDSCH with different TCI states including the spatial receiver parameter simultaneously.

In some implementations, TDRA field in the DCI may indicate an entry in a PDSCH time domain allocation list (e.g., pdsch-TimeDomainAllocationList) not containing a repetition number of PDSCH transmission (e.g., Rep-Num16), and DM-RS ports indicated in the DCI are within two CDM groups. Accordingly, please refer to FIG. 10B, in these implementations, the method may further include operation S1003-1. Operation S1003-1 is executed to determine, by the UE, that a first TCI state of the two specific TCI states corresponds to one CDM group of a first DM-RS port indicated by the DCI and a second TCI state of the two specific TCI states corresponds to the other CDM group.

In some implementations, TDRA field in the DCI may indicate an entry in the PDSCH time domain allocation list (e.g., pdsch-TimeDomainAllocationList) containing the repetition number of PDSCH transmission (e.g., RepNum16), or the UE may be configured by a parameter of repetition scheme (e.g., higher layer parameter RepSchemeEnabler) as for time division multiplexing scheme (e.g., TDMSchemeA) and DM-RS ports indicated in the DCI 102A are within one CDM group. Accordingly, please refer to FIG. 10C, in these implementations, the method may further include operation S1003-2. Operation S1003-2 is executed to determine, by the UE, that a first TCI state of the two TCI states corresponds to even PDSCH transmission occasions and a second TCI state of the two TCI states corresponds to odd PDSCH transmission occasions.

In some implementations, the UE may be configured by the parameter of repetition scheme (e.g., higher layer parameter RepSchemeEnabler) as first frequency division multiplexing scheme (e.g., TDMSchemeA) or second frequency division multiplexing scheme (e.g., TDMSchemeB), DM-RS ports may be indicated within one CDM group, and precoding granularity may be determined as wideband. Accordingly, please refer to FIG. 10D, in these implementations, the method may further include operation S1003-3. Operation S1003-3 is executed to determine, by the UE, that first $$\left\lceil \frac{n_{PRB}}{2} \right\rceil$$

PRBs correspond to a first TCI state of the two specific TCI states and remaining $$\left\lfloor \frac{n_{PRB}}{2} \right\rfloor$$

PRBs correspond to a second TCI state of the two specific TCI states. Where $n_{PRB}$ is the total number of allocated PRBs for the UE.

In some implementations, the UE may be configured by the parameter of repetition scheme (e.g., higher layer parameter RepSchemeEnabler) as first frequency division multiplexing scheme (e.g., TDMSchemeA) or second frequency division multiplexing scheme (e.g., TDMSchemeB), DM-RS ports indicated are within one CDM group, and precoding granularity may be determined as one of the values among {2, 4}. Accordingly, please refer to FIG. 10E, in these implementations, the method may further include operation S1003-4. Operation S1003-4 is executed to determine, by the UE, that even PRGs within allocated frequency domain resources correspond to a first TCI state of the two specific TCI states and odd PRGs within allocated frequency domain resources correspond to a second TCI state of the two specific TCI states.

Figure 11:
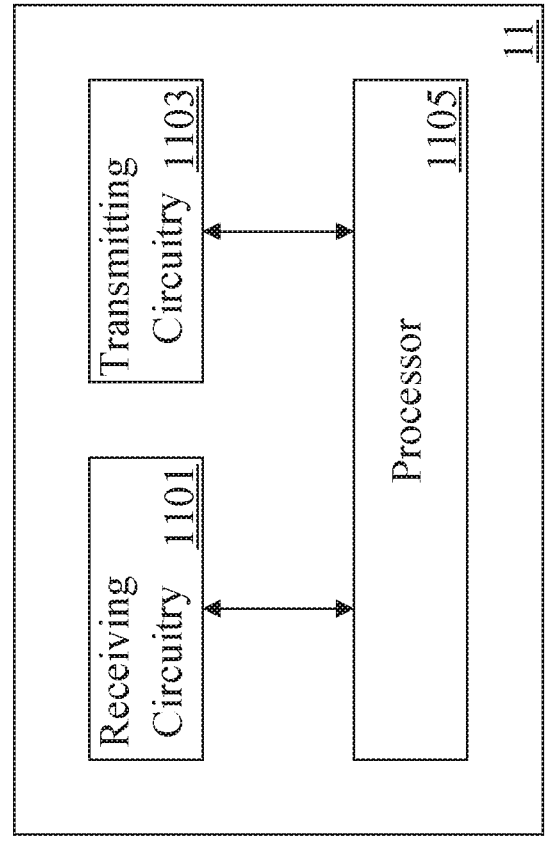
FIG. 11 illustrates a block diagram of an exemplary apparatus in accordance with some embodiments of the present application.

FIG. 11 illustrates an example block diagram of an apparatus 11 according to an embodiment of the present disclosure.

As shown in FIG. 11, the apparatus 11 may include at least one non-transitory computer-readable medium (not illustrated in FIG. 11), a receiving circuitry 1101, a transmitting circuitry 1103, and a processor 1105 coupled to the non-transitory computer-readable medium (not illustrated in FIG. 11), the receiving circuitry 1101 and the transmitting circuitry 1103. The apparatus 11 may be an UE.

Although in this figure, elements such as processor 1105, transmitting circuitry 1103, and receiving circuitry 1101 are described in the singular, the plural is contemplated unless limitation to the singular is explicitly stated. In some embodiments of the present disclosure, the receiving circuitry 1101 and the transmitting circuitry 1103 are combined into a single device, such as a transceiver. In certain embodiments of the present disclosure, the apparatus 11 may further include an input device, a memory, and/or other components.

In some embodiments of the present disclosure, the non-transitory computer-readable medium may have stored thereon computer-executable instructions to cause a processor to implement the method with respect to the user equipment as described above. For example, the computer-executable instructions, when executed, cause the processor 11 interacting with receiving circuitry 1101 and transmitting circuitry 1103, so as to perform the operations with respect to UE depicted in FIGS. 2A and 2B.

Those having ordinary skill in the art would understand that the operations of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "includes", "including", or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a", "an", or the like does not, without more constraints, preclude the existence of additional identical elements in the process, method, article, or apparatus that includes the element. Also, the term "another" is defined as at least a second or more. The term "having" and the like, as used herein, are defined as "including".

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method performed by a user equipment (UE), comprising:
   determining at least one transmission configuration indicator (TCI) state for receiving a physical downlink shared channel (PDSCH) or an aperiodic channel state information reference signal (AP CSI-RS), wherein multiple TCI states are activated for at least one control resource set (CORESET) in an active bandwidth part (BWP) in a serving cell; and
   calculating a time offset between a reception of a downlink control information (DCI) and a PDSCH corresponding to the DCI,
   wherein in response to the time offset being equal to or greater than a threshold and a format of the DCI being without TCI field, determining the at least one TCI state for receiving the PDSCH comprises determining two specific TCI states of a specific CORESET used for transmitting a PDSCH.

2. The method of claim 1, wherein the two specific TCI states are determined for receiving the PDSCH.

3. The method of claim 2, wherein the UE is not configured with a parameter which indicates the UE to apply two default TCI states of single-DCI based multi-transmission reception point (TRP) transmission, or the UE is configured with the parameter and no TCI codepoint activated to the UE for PDSCH maps to two TCI states.

4. The method of claim 2, wherein the format of the DCI being without TCI field is configured by having no TCI present parameter for a specific CORESET used for transmitting the DCI, at least one TCI present parameter is configured for another CORESET configured in the active BWP of the serving cell, and the UE is configured with a parameter which indicates the UE to apply two default TCI states and at least one TCI codepoint activated to the UE for PDSCH maps to two TCI states.

5. The method of claim 2, wherein time domain resource assignment (TDRA) field in the DCI indicates an entry in a PDSCH time domain allocation list not containing a repetition number of PDSCH transmission and demodulation reference signal (DM-RS) ports indicated in the DCI are within two code division multiplexing (CDM) groups.

6. The method of claim 2, wherein TDRA field in the DCI indicates an entry in a PDSCH time domain allocation list containing a repetition number of PDSCH transmission, or the UE is configured by a parameter of repetition scheme as for time division multiplexing scheme and DM-RS ports indicated in the DCI are within one CDM group.

7. The method of claim 2, wherein the UE is configured by a parameter as first frequency division multiplexing scheme or second frequency division multiplexing scheme, DM-RS ports are indicated within a CDM group and precoding granularity is determined as wideband, and the method further comprises:
   determining that first $$\left\lceil \frac{n_{PRB}}{2} \right\rceil$$

physical resource blocks (PRBs) correspond to a first TCI state of and remaining $$\left\lfloor \frac{n_{PRB}}{2} \right\rfloor$$

PRBs correspond to a second TCI state, where $n_{PRB}$ is a total number of allocated PRBs for the UE.

8. The method of claim 2, wherein the UE is configured by a parameter as first frequency division multiplexing scheme or second frequency division multiplexing scheme, DM-RS ports are indicated within a CDM group and P'$_{BWP,i}$ is determined as one of values among {2, 4}.

9. The method of claim 1, wherein the at least one TCI state is determined for receiving the AP CSI-RS, and the method further comprises:
   calculating an offset between last symbol of last PDCCH and first symbol of AP CSI-RS resource, wherein the last PDCCH carries a DCI for triggering AP CSI-RS transmission, and the AP CSI-RS resource is in a non-zero power channel state information reference signal (NZP-CSI-RS) resource set configured without a parameter of tracking reference information,
   wherein the offset is less than a threshold, and determining the at least one TCI state for receiving the AP CSI-RS comprises:
   determining one specific TCI state with a lowest TCI state identity number from a plurality of TCI states which is activated for a specific CORESET associated with a monitored search space, the COREST comprises a lowest CORESET identify number in a latest slot within the active BWP of the serving cell monitored by the UE.

10. The method of claim 9, wherein in the same symbols of the AP CSI-RS resources are without any other downlink signal, which refers to a PDSCH scheduled with a time offset larger than or equal to another threshold, having an indicated TCI state.

11. The method of claim 1, wherein the at least one TCI state is determined for receiving PDSCH, wherein a DCI format is without TCI field and a plurality of TCI states is activated for the CORESET used for transmitting the DCI.

12. The method of claim 11, wherein TDRA field in the DCI indicates an entry in a PDSCH time domain allocation list not containing a repetition number of PDSCH transmission and DM-RS ports indicated in the DCI are within two CDM groups.

13. The method of claim 11, wherein TDRA field in the DCI indicates an entry in a PDSCH time domain allocation list containing a repetition number of PDSCH transmission, or the UE is configured by a parameter of repetition scheme as first time division multiplexing scheme and DM-RS ports indicated in the DCI are within a CDM group.

14. The method of claim 11, wherein the UE is configured by a parameter as first frequency division multiplexing scheme or second frequency division scheme, DM-RS ports are indicated within a CDM group and precoding granularity is determined as wideband, and the method further comprises:
   determining that first $$\left\lceil \frac{n_{PRB}}{2} \right\rceil$$

PRBs correspond to a first TCI state and remaining $$\left\lfloor \frac{n_{PRB}}{2} \right\rfloor$$

PRBs correspond to a second TCI state, where $n_{PRB}$ is a total number of allocated PRBs for the UE.

15. The method of claim 11, wherein the UE is configured by a parameter as first frequency division multiplexing scheme or second frequency division multiplexing scheme, DM-RS ports are indicated within a CDM group and P'$_{BWP,i}$ is determined as one of values among {2, 4}.

16. A user equipment (UE), comprising:
   at least one memory; and
   at least one processor coupled with the at least one memory and configured to cause the UE to:
      determine at least one transmission configuration indicator (TCI) state for receiving a physical downlink shared channel (PDSCH) or an aperiodic channel state information reference signal (AP CSI-RS), wherein multiple TCI states are activated for at least one control resource set (CORESET) in an active bandwidth part (BWP) in a serving cell; and
      calculate a time offset between a reception of a downlink control information (DCI) and a PDSCH corresponding to the DCI;
      wherein in response to the time offset being equal to or greater than a threshold and a format of the DCI being without TCI field, determining the at least one TCI state for receiving the PDSCH comprises determining two specific TCI states of a specific CORESET used for transmitting a PDSCH.

17. The UE of claim 16, wherein the two specific TCI states are determined for receiving the PDSCH.

18. The UE of claim 17, wherein the UE is not configured with a parameter which indicates the UE to apply two default TCI states of single-DCI based multi-transmission reception point (TRP) transmission, or the UE is configured with the parameter and no TCI codepoint activated to the UE for PDSCH maps to two TCI states.

19. The UE of claim 16, wherein the at least one TCI state is determined for receiving the AP CSI-RS, and the method further comprises:

calculating an offset between last symbol of last PDCCH and first symbol of AP CSI-RS resource, wherein the last PDCCH carries a DCI for triggering AP CSI-RS transmission, and the AP CSI-RS resource is in a non-zero power channel state information reference signal (NZP-CSI-RS) resource set configured without a parameter of tracking reference information, wherein the offset is less than a threshold, and determining the at least one TCI state for receiving the AP CSI-RS comprises:

determining one specific TCI state with a lowest TCI state identity number from a plurality of TCI states which is activated for a specific CORESET associated with a monitored search space, the COREST comprises a lowest CORESET identify number in a latest slot within the active BWP of the serving cell monitored by the UE.

20. The UE of claim 19, wherein in the same symbols of the AP CSI-RS resources are without any other downlink signal, which refers to a PDSCH scheduled with a time offset larger than or equal to another threshold, having an indicated TCI state.

* * * * *